US008794123B2

(12) United States Patent
Bento et al.

(10) Patent No.: US 8,794,123 B2
(45) Date of Patent: Aug. 5, 2014

(54) DOUBLE VALVE CONSTRUCTED FROM UNITARY SINGLE VALVES

(75) Inventors: José Carlos Bento, São Paulo (BR); Eric Oden Cummings, Simpsonville, SC (US)

(73) Assignee: Ross Operating Valve Company, Troy, MI (US)

( * ) Notice: Subject to any disclaimer, the term of this patent is extended or adjusted under 35 U.S.C. 154(b) by 1181 days.

(21) Appl. No.: 12/722,758

(22) Filed: Mar. 12, 2010

(65) Prior Publication Data
US 2011/0220822 A1 Sep. 15, 2011

(51) Int. Cl.
*F15B 11/08* (2006.01)
(52) U.S. Cl.
USPC ............. 91/424; 91/455; 91/444; 91/466; 137/596.16
(58) Field of Classification Search
USPC ............. 91/455, 444, 466, 424; 137/596.16, 137/596.14
See application file for complete search history.

(56) References Cited

U.S. PATENT DOCUMENTS

| | | | | | |
|---|---|---|---|---|---|
| 1,912,861 | A | * | 6/1933 | Sauerbrey | 91/425 |
| 3,024,768 | A | * | 3/1962 | Shalgren | 91/424 |
| 3,084,676 | A | * | 4/1963 | Herion et al. | 91/424 |
| 3,265,089 | A | * | 8/1966 | Nill | 137/596.16 |
| 3,411,411 | A | * | 11/1968 | Fleck et al. | 91/30 |
| 3,483,891 | A | * | 12/1969 | Carrieri | 137/596.16 |
| 3,580,281 | A | * | 5/1971 | Petersen | 137/596.16 |
| 4,748,896 | A | | 6/1988 | Ott et al. | |
| 6,478,049 | B2 | * | 11/2002 | Bento et al. | 137/596.16 |
| 7,114,521 | B2 | * | 10/2006 | Bento | 137/596.16 |
| 7,278,262 | B2 | * | 10/2007 | Moon | 60/469 |

FOREIGN PATENT DOCUMENTS

| | | |
|---|---|---|
| DE | 2062156 | 7/1972 |
| DE | 2949229 | 6/1981 |
| DE | 9406561 | 7/1994 |
| EP | 1512873 A2 | 3/2005 |

OTHER PUBLICATIONS

International Search Report and Written Opinion mailed Dec. 2, 2010 for Application No. PCT/US2010/042983.

* cited by examiner

*Primary Examiner* — Edward Look
*Assistant Examiner* — Michael Quandt
(74) *Attorney, Agent, or Firm* — Carlson, Gaskey & Olds, P.C.

(57) ABSTRACT

A double valve includes a first unitary valve assembly and a second unitary valve assembly. Each unitary valve assembly includes a first outlet port, a second outlet port, and a spool. A first pilot assembly and a second pilot assembly are coupled to the first unitary valve assembly and the second unitary valve assembly, respectively. A plate is coupled to the unitary valve assemblies and includes a passage to provide a first common outlet passage that is coupled to the respective first outlet ports of the unitary valve assemblies and a second common outlet passage that is coupled to the respective second outlet ports of the unitary valve assemblies. When the spools are in a first position, fluid flows through the first common outlet passage, and when the spools are in a second position, the fluid flows through the second common outlet passage.

14 Claims, 23 Drawing Sheets

DOUBLE VALVE CONSTRUCTED FROM UNITARY SINGLE VALVES

BACKGROUND OF THE INVENTION

The present invention relates generally to a control valve, and more specifically to a double valve constructed from two unitary valve assemblies.

Pneumatically powered machine tools operate through a valve system which interacts with a pneumatically controlled clutch and/or a brake assembly. For safety reasons, control valves that operate the machine tools require the operator to simultaneously activate two separate control switches to ensure that the operator's hands are away from moving components of the machine tool when initiating an operating cycle. An electronic circuit responsive to the two control switches generates a pilot control signal applied to solenoid pilot valves to control delivery of a fluid through the valve system to the machine tool.

In a typical 3-2 normally closed double valve, two movable valve assemblies are mounted within respective bores within a single valve body. This is in contrast, for example, to a 3-2 normally open valve. To achieve a normally-open function rather than a normally-closed function, the input and output pressures cannot simply be swapped. Rather, the current state of the art is to use two separate valve assemblies in a particular configuration to otherwise achieve a 3-2 normally open function. In one prior double valve, the solenoid pilot valves are moved to an actuated position in response to an electrical control signal from a respective operator-controlled switch, which allows fluid to flow through a single outlet passage of the double valve. If a valve assembly does not deactuate or actuate properly, or if the solenoid pilot valves are actuated or deactuated non-simultaneously, the double valve can malfunction. As the double valve includes a single outlet passage, the fluid can only be directed to a single location.

SUMMARY OF THE INVENTION

A double valve includes a first unitary valve assembly and a second unitary valve assembly. Each unitary valve assembly includes a first outlet port, a second outlet port, and a spool. A first pilot assembly and a second pilot assembly are coupled to the first unitary valve assembly and the second unitary valve assembly, respectively. A plate is coupled to the unitary valve assemblies and includes a passage to provide a first common outlet passage that is coupled to the respective first outlet ports of the unitary valve assemblies and a second common outlet passage that is coupled to the respective second outlet ports of the unitary valve assemblies. When the spools are in a first position, fluid flows through the first common outlet passage, and when the spools are in a second position, the fluid flows through the second common outlet passage.

A pneumatically powered machine tool includes the above described double valve. When the unitary valve assemblies are in the first position, the fluid flows to a first end of a cylinder. When the unitary valve assemblies are in the second position, the fluid flows to a second end of a cylinder.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompanies the detailed description can be briefly described as follows.

DETAILED DESCRIPTION OF PREFERRED EMBODIMENTS

Figure 1:
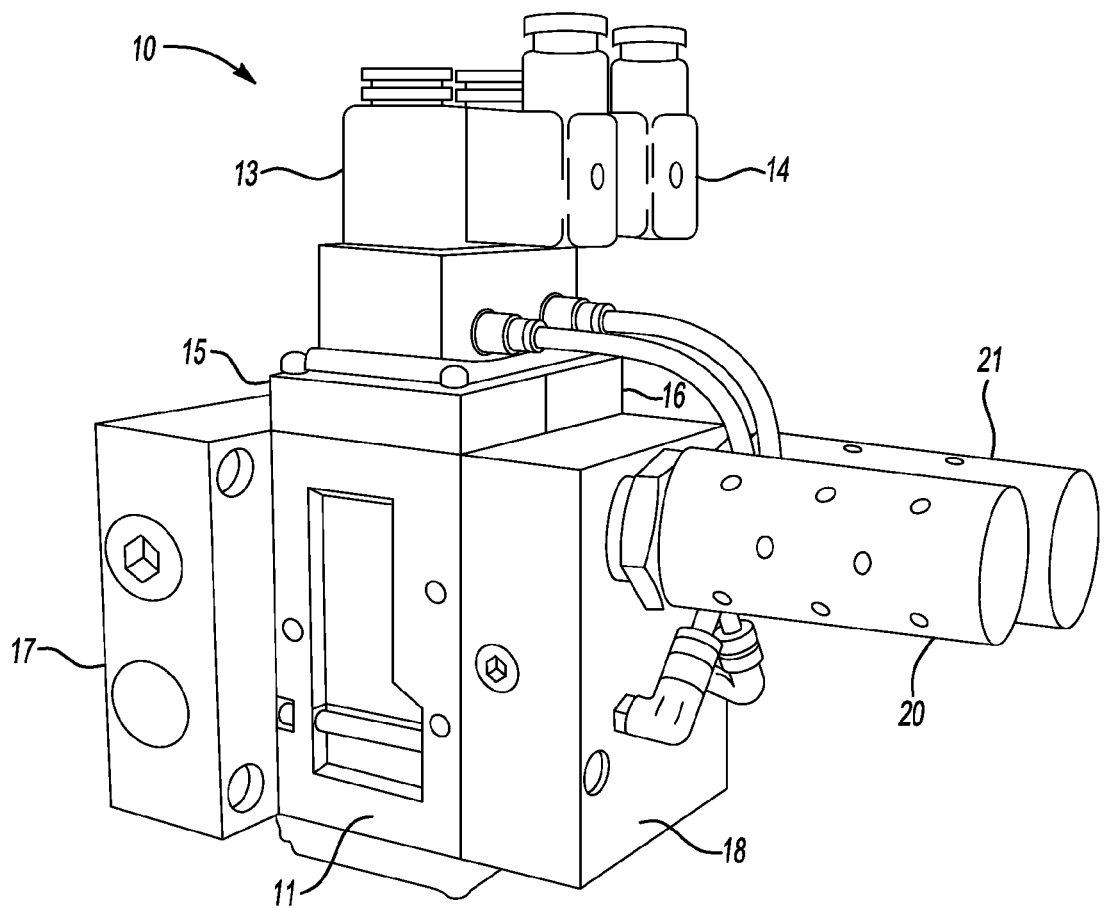
FIG. 1 is a perspective view of a double valve.
Figure 2:
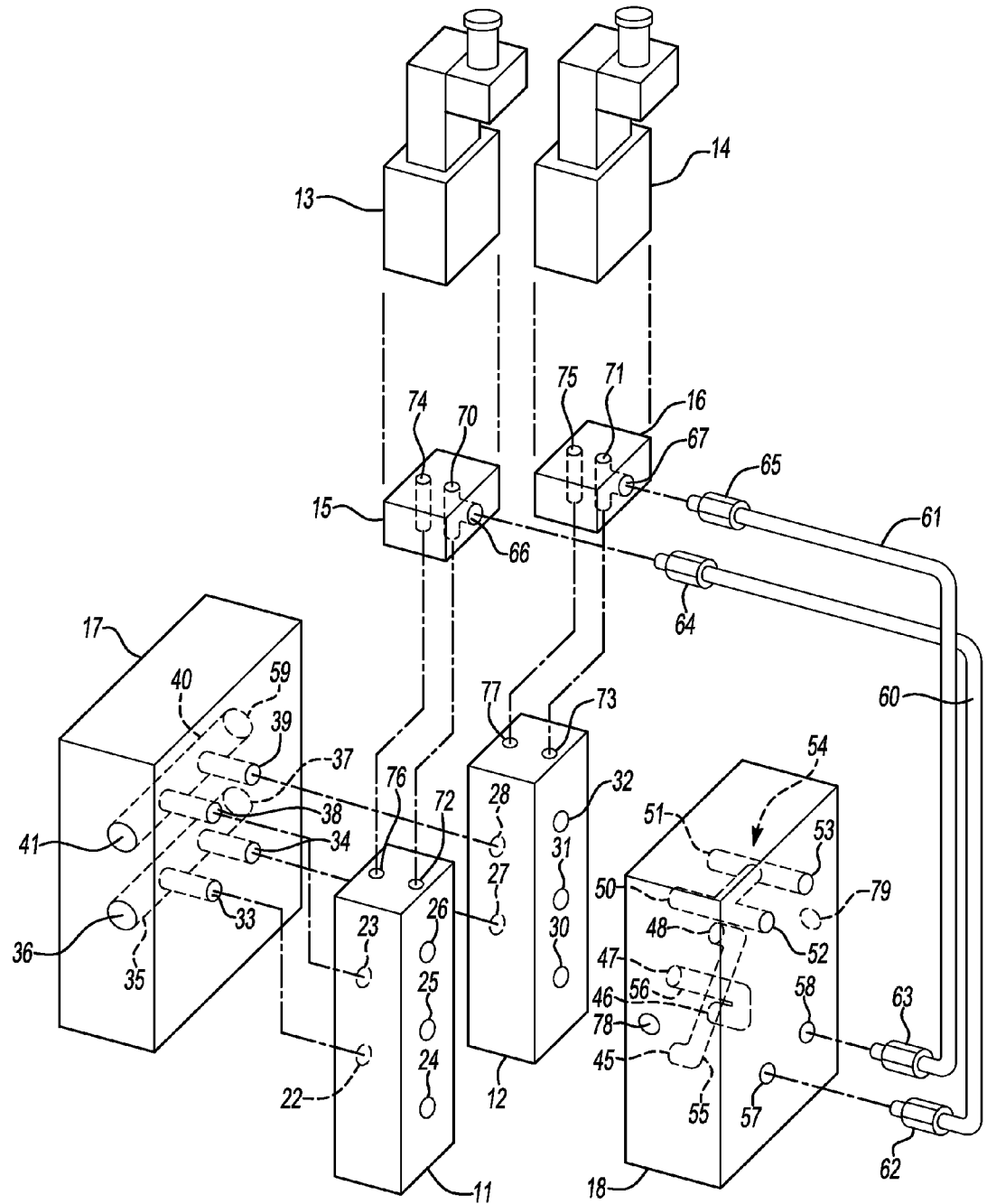
FIG. 2 is an exploded perspective view of the double valve of FIG. 1.

FIGS. 1 and 2 illustrate a double valve 10 including a first unitary valve assembly 11 and a second unitary valve assembly 12. The double valve 10 can be used with pneumatically powered machine tools that operate through a valving system which interacts with a pneumatically controlled clutch and/or a brake assembly. In one example, the first and second unitary valve assemblies 11 and 12 are standard single valves. A pair of solenoid pilot valves 13 and 14 are coupled to the unitary valve assemblies 11 and 12, respectively, by adapter blocks 15 and 16, respectively. A first plate 17 is coupled to one side of both the first and second unitary valve assemblies 11 and 12, and a second plate 18 is coupled to an opposite side of the first and second unitary valve assemblies 11 and 12. Although the plates 17 and 18 are shown as separate plates, it is possible that the plates 17 and 18 could be combined into a single plate. A pair of exhaust silencers 20 and 21 are coupled to exhaust ports on the second plate 18 to muffle noise. The first unitary valve assembly 11 includes an inlet port 22, an outlet port 23, a first cross-mirror port 24, a second cross-mirror port 25, and an exhaust port 26. The second unitary valve assembly 12 includes an inlet port 27, an outlet port 28, a first cross-mirror port 30, a second cross-mirror port 31, and an exhaust port 32. The first and second unitary valve assemblies 11 and 12 are 5/2 way valves. After incorporation into the double valve 10, a 3/2-way valve is formed.

An inlet circuit contained in the first plate 17 includes inlet ports 33 and 34, an inlet passage 35, and external inlet ports 36 and 37 at opposite ends of the first plate 17. The inlet ports 22 and 27 are coupled to the inlet ports 33 and 34, respectively. An outlet circuit contained in the first plate 17 includes outlet ports 38 and 39, an outlet passage 40, and external outlet ports 41 and 59 at opposite ends of the first plate 17. The outlet ports 23 and 28 are coupled to the outlet ports 38 and 39, respectively. As the first plate 17 includes two inlet ports 33 and 34 and two outlet ports 37 and 38, one port can be used as a working port, and the second port can be used as a sensing port. For example, a pressure switch or a pressure transducer can be used to monitor the outlet pressure at the outlet port to function as a sensing port.

The second plate 18 includes various internal passages for coupling with the first and second unitary valve assemblies 11 and 12. The second plate 18 includes a first cross-connection including ports 45 and 48 interconnected by a cross-connection passage 55 for cross connecting the first cross-mirror port 24 of the first unitary valve assembly 11 with the second cross-mirror port 31 of the second unitary valve assembly 12. The second plate 18 includes a second cross-connection including ports 46 and 47 interconnected by a cross-connection passage 56 for cross connecting the second cross-mirror port 25 of the first unitary valve assembly 11 with the first cross-mirror port 30 of second unitary valve assembly 12.

The second plate 18 also includes an exhaust circuit for interconnecting the exhaust ports 26 and 32 of the first and second unitary valve assemblies 11 and 12, respectively. The second plate 18 includes exhaust ports 50, 51, 52 and 53, and an exhaust passage 54 interconnects the exhaust ports 50 and 51 with the exhaust ports 52 and 53, respectively. The exhaust ports 50 and 51 are coupled to the exhaust ports 26 and 32 of the first and second unitary valve assemblies 11 and 12, respectively. The exhaust ports 52 and 53 on the exterior side of the second plate 18 can be coupled to the exhaust silencers 20 and 21, respectively (shown in FIG. 1).

The second plate 18 includes pilot ports 57 and 58 coupled to the cross-connection passages 55 and 56, respectively, by other internal passages (not shown). The pilot connections include a pair of tubes 60 and 61 for supplying pilot pressure to the solenoid pilot valves 13 and 14, respectively. A pair of elbow connections 62 and 63 couple the tubes 60 and 61, respectively, to the pilot ports 57 and 58, respectively. Fittings 64 and 65 are coupled to connections 66 and 67, respectively, in the adapter blocks 15 and 16, respectively. The connections 66 and 67 are coupled to passages 70 and 71, respectively, for supplying a source of pilot pressure to standard inlets in the solenoid pilot valves 13 and 14, respectively. The passages 70 and 71 may also correspond with the pilot supply ports 72 and 73, respectively, on the first and second unitary valve assemblies 11 and 12, respectively.

A pair of passages 74 and 75 in the adapter blocks 15 and 16, respectively, couple the output of the solenoid pilot valves 13 and 14, respectively, to the pilot passages 76 and 77, respectively, of the first and second unitary valve assemblies 11 and 12, respectively, to actuate the first and second unitary valve assemblies 11 and 12, respectively, when the corresponding solenoid pilot valves 13 and 14, respectively, are actuated by one or more electrical switches (not shown) to supply or remove a source of pressurized fluid. In one example, the fluid is pressurized air or hydraulic oil. In another example, instead of using external tubings, pilot connections for supplying pilot pressure to the solenoid pilot valves 13 and 14 can include internal passages within the bodies of the first and secondary unitary valve assemblies 11 and 12, respectively, and/or within the second plate 18.

The second plate 18 also includes sensing ports 78 and 79 that are interconnected with the cross-connection passages 55 and 56, respectively, by other internal passages (not shown) for providing sensing ports.

FIGS. 3a to 6b illustrate a first example double valve 10. The first and second unitary valve assemblies 11 and 12 include spools 80 and 81, respectively, received in longitudinal bores 82 and 83, respectively, of valve bodies 84 and 85, respectively. The first and second unitary valve assemblies 11 and 12 are 5 port, 2 position valves (5/2-way valves) including inlet ports 86 and 87, respectively, outlet ports 88 and 89, respectively, exhaust ports 90 and 91, respectively, first cross-mirror ports 92 and 93, respectively, and second cross-mirror ports 94 and 95, respectively. The ports of the first and second unitary valve assemblies 11 and 12 are interconnected by an inlet passage 35, an outlet passage 40, an exhaust passage 54, a first cross-connection passage 55 (defined by the first cross-mirror port 92 and the second cross mirror port 89), and a second cross-connection passage 56 (defined by the first cross-mirror port 93 and the second cross-mirror port 94).

The first plate 17 and the second plate 18 for implementing the passages 35, 40, 54, 55 and 56 are not explicitly shown. The inlet passage 35, the outlet passage 40, and the exhaust passage 54 include external ports so the equivalent of a 3/2-way valve is achieved by the interconnection of the two 5/2-way unitary valve assemblies 11 and 12.

During operation, the double valve 10 is in an initial deactivated position. That is, during normal operation, fluid flows through the double valve 10. When both electrical switches actuate the corresponding solenoid pilot valve 13 and 14, the double valve 10 is actuated, preventing the flow of the fluid through the double valve 10.

Figure 3A:
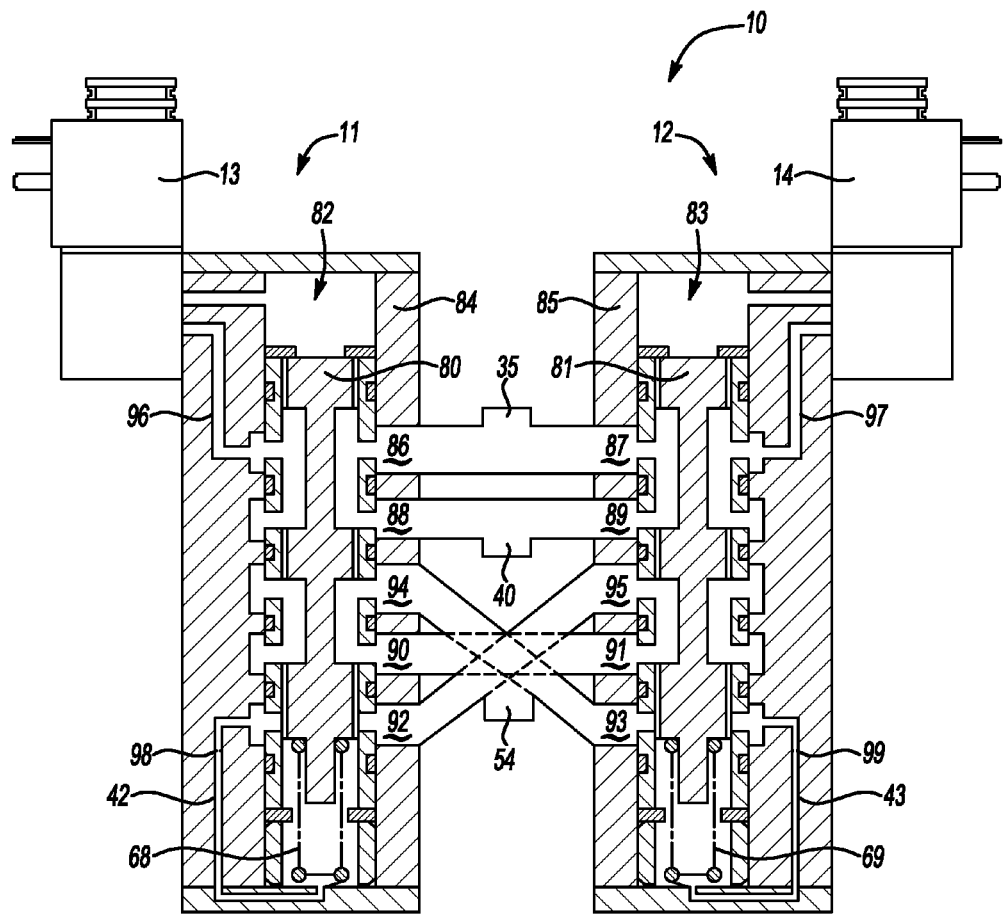
FIG. 3a is a side cross-sectional view of a 3/2 double valve in an initial, deactuated position.
Figure 3B:
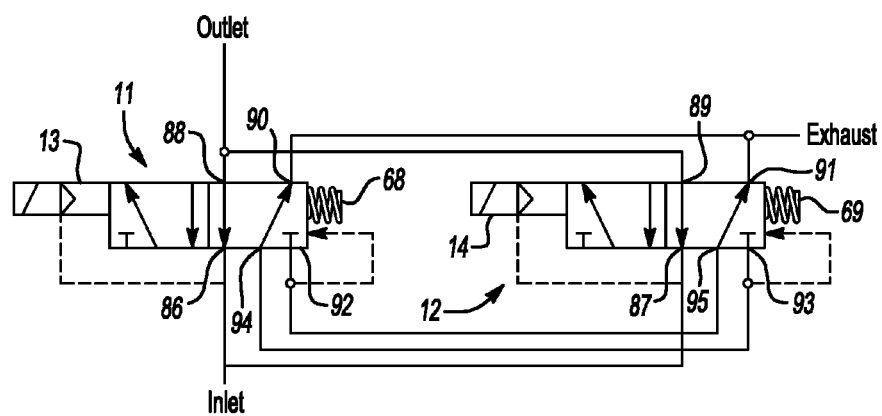
FIG. 3b is a pneumatic circuit diagram showing the 3/2 double valve in the deactuated position.

FIG. 3a shows the double valve 10 in the deactuated position, and FIG. 3b shows a schematic representation of the pneumatic circuits of the double valve 10.

Pressurized fluid enters the double valve 10 through the inlet passage 35 and from the inlet ports 86 and 87 is provided to the solenoid pilot valves 13 and 14, respectively, via passages 96 and 97, respectively. Return resilient members 68 and 69 urge the spools 80 and 81 upwardly (with respect to FIG. 3a). In one example, the resilient members 68 and 69 are springs. The areas within the bores 82 and 83, respectively, under the spools 80 and 81, respectively, are coupled to the first cross-mirror ports 92 and 93, respectively, via passages 42 and 43, respectively. The exhaust ports 90 and 91 are coupled to the second cross-mirror ports 94 and 95, respectively. As the solenoid pilot valves 13 and 14 are not actuated, fluid does not flow into the bores 82 and 83; therefore, the bores 82 and 83 are not pressurized. The fluid flows into the inlet passage 35, flows through the inlet ports 86 and 87 to the outlet ports 88 and 89, and exits the double valve 10 through the outlet passage 40.

Figure 4A:
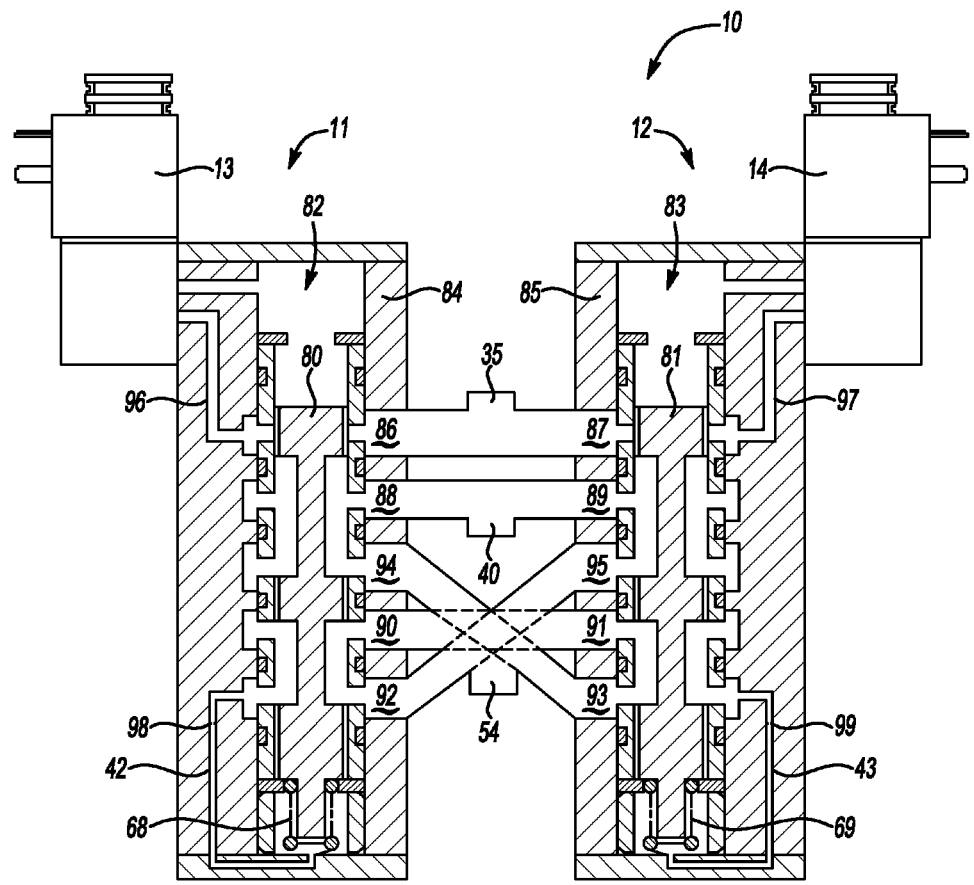
FIG. 4a is a side cross-sectional view of the 3/2 double valve in an actuated position.
Figure 4B:
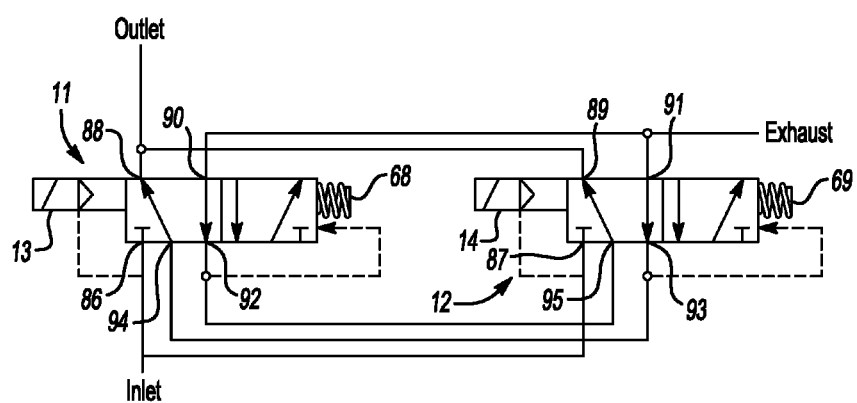
FIG. 4b is pneumatic circuit diagram showing the 3/2 double valve in the actuated position.

FIG. 4a shows the double valve 10 in the actuated position, and FIG. 4b shows a schematic representation of the pneumatic circuits of the double valve 10. When the solenoid pilot valves 13 and 14 are actuated by one or more electrical switches (not shown), a source of pressurized fluid is supplied to actuate the double valve 10. When the double valve 10 is actuated, the passages 96 and 97 are pressurized so that actuation of the solenoid pilot valves 13 and 14 pressurizes the bores 82 and 83, respectively, applying pressure to the spools 80 and 81, respectively, to move the spools 80 and 81, respectively, against the bias of the resilient members 68 and 69, respectively, to the actuated position, as shown in FIG. 4a. In the actuated position, the spools 80 and 81 block the inlet ports 86 and 87, respectively, preventing the flow of fluid through the double valve 10. Fluid in the double valve 10 is exhausted through the exhaust passage 54. For example, the pressurized fluid from the outlet passage 40 flows through the outlet ports 88 and 89, respectively, to the second cross-mirror ports 94 and 95, respectively, through the cross-connection passage 55 and 56, respectively, through the first cross-mirror ports 92 and 93, respectively, through the exhaust ports 94 and 95, respectively, and exits the double valve 10 through the exhaust passage 54.

Figure 5A:
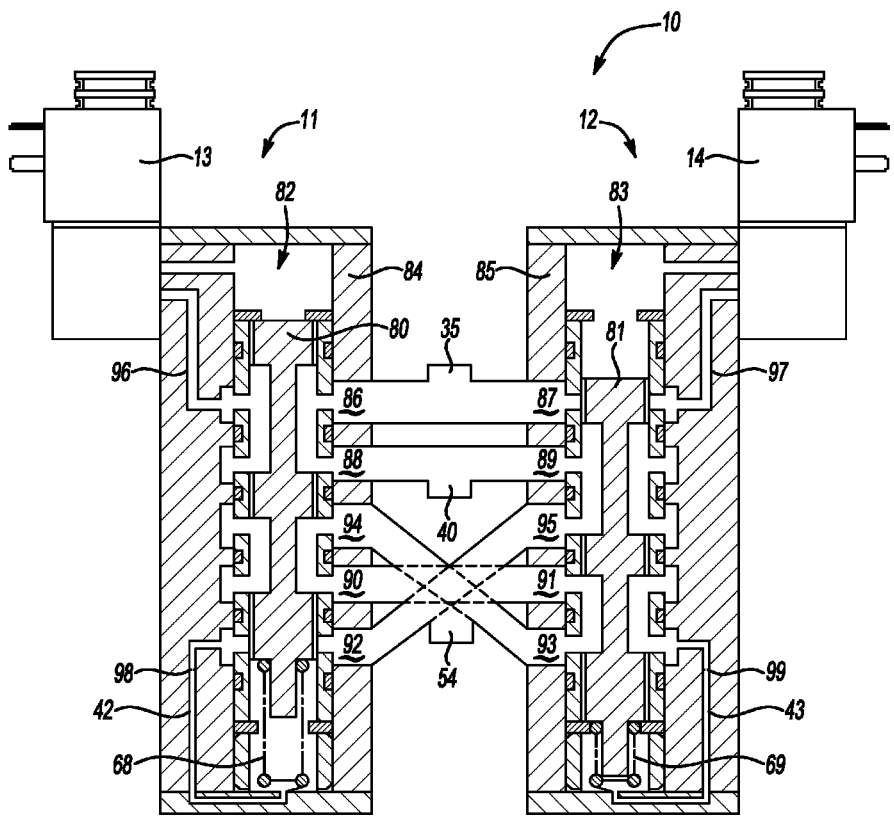
FIG. 5a is a side cross-sectional view of the 3/2 double valve in an errored and fail to safe position.
Figure 5B:
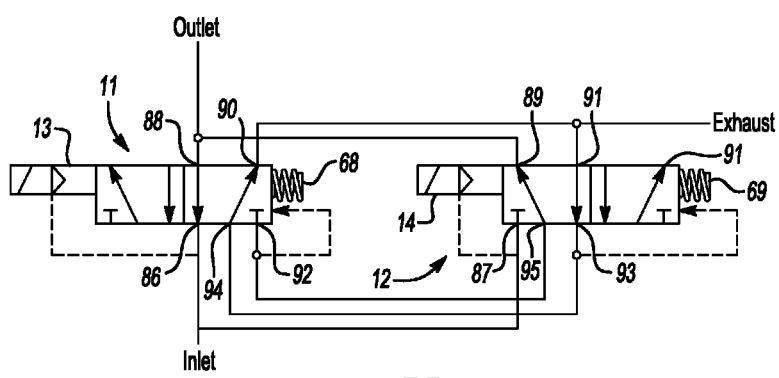
FIG. 5b is a pneumatic circuit diagram showing the 3/2 double valve in the errored and fail to safe position.
Figure 6A:
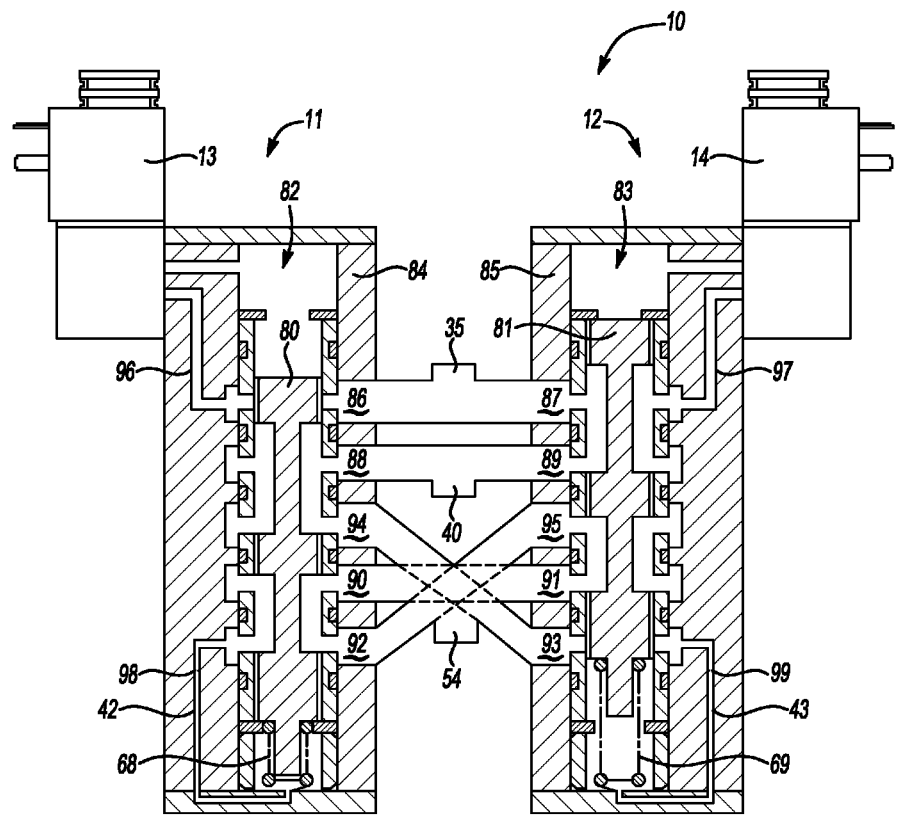
FIG. 6a is a side cross-sectional view of the 3/2 double valve in another errored and fail to safe position.
Figure 6B:
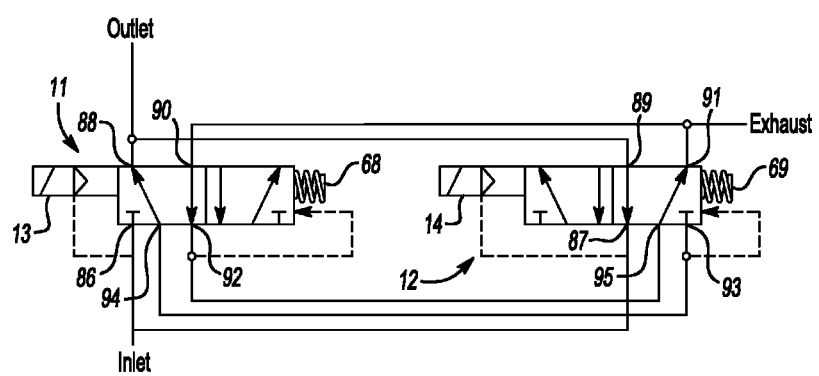
FIG. 6b is a pneumatic circuit diagram showing the 3/2 double valve in the another errored and fail to safe position.

FIGS. 5a and 6a show the double valve 10 in errored and fail to safe, or "faulted," positions, and FIGS. 5b and 6b, respectively, show a schematic representation of the pneumatic circuits of the double valve 10 in the errored and fail to safe positions. In FIGS. 5a and 5b, the first unitary valve assembly 11 is in the deactuated position, and the second unitary valve assembly 12 is in the actuated position. In FIGS. 6a and 6b, the first unitary valve assembly 11 is in the actuated position, and the second unitary valve assembly 12 is in the deactuated position.

In the example of FIGS. 5a and 5b, the first unitary valve assembly 11 does not actuate as there is no pressure on the spool 80. Therefore, the bore 82 is not pressurized; only the bore 83 is pressurized. The pressure in the bore 82 causes the spool 81 to lower against the bias of the resilient member 69. The fluid entering the inlet passage 35 flows through the inlet port 86, through the outlet port 88, and exits the double valve 10 through the outlet passage 40. The second unitary valve assembly 12 in the actuated position couples the outlet passage 40 to the cross connection passage 55, thereby depressurizing the first cross-mirror port 92 of the deactuated first unitary valve assembly 11, and fluid flows through the passage 42 to the area under the spool 80. The passage 42 includes a flow restrictor 98 and acts as a monitoring channel, providing a source of pressure under the spool 80 to maintain the spool 80 in the deactuated condition. No pressure is provided to the solenoid pilot valve 13 of the deactuated first unitary valve assembly 11, preventing actuation of the first unitary valve assembly 11. However, the double valve 10 can still operate as usual as fluid entering the inlet passage 35 flows through the inlet port 86, through the outlet port 88, and exits the double valve 10 through the outlet passage 40. Therefore, a pneumatic press or other equipment operated by the double valve 10 can continue to be actuated until the maulfunction in the double valve 10 is corrected. Once the malfunction is discovered (for example, by the use of a pressure switch), the malfunction can be corrected, and the double valve 10 can operate normally.

In the example of FIGS. 6a and 6b, the first unitary valve assembly 12 does not actuate as there is no pressure on the spool 81. Therefore, the bore 83 is not pressurized; only the bore 82 is pressurized. The pressure in the bore 83 causes the spool 82 to lower against the bias of the resilient member 68. The fluid entering the inlet passage 35 flows through the inlet port 87, through the outlet port 89, and exits the double valve through the outlet passage 40. The first unitary valve assembly 11 in the actuated position couples the outlet passage 40 to the cross connection passage 56, thereby depressurizing the first cross-mirror port 93 of the deactuated second unitary valve assembly 12, and fluid flows through the passage 43 to the area under the spool 81. The passage 43 includes a flow restrictor 99 and acts as a monitoring channel, providing a source of pressure under the spool 81 to maintain the spool 81 in the deactuated position. No pressure is provided to the solenoid pilot valve 14 of the deactuated second unitary valve assembly 12, preventing actuation. However, the double valve 10 can still operate as usual as fluid entering the inlet passage 35 flows through the inlet port 87, through the outlet port 79, and exits the double valve 10 through the outlet passage 40. Therefore, a pneumatic press or other equipment operated by the double valve 10 can be actuated until the malfunction in the double valve 10 is corrected. Once the malfunction is discovered (for example, by the use of a pressure switch), the malfunction can be corrected and the double valve 10 can operate normally.

Regardless of the type of malfunction, the double valve 10 continues to operate as usual during the time of the malfunction, allowing a continuous source of fluid to flow through the double valve 10.

FIGS. 7a to 10b illustrate another double valve 110 including first and second unitary valve assemblies 111 and 112. The double valve 110 includes spools 180 and 181, respectively, received in longitudinal bores 182 and 183, respectively, of valve bodies 184 and 185, respectively. The spools 180 and 181 are inverted relative to each other. The first and second unitary valve assemblies 111 and 112 are each 5 port, 2 position valves (5/2-way valves). The first and second unitary valve assemblies 111 and 112 include inlet ports 186 and 187, respectively, outlet ports 189a and 189b, respectively, ports 188a and 188b, exhaust ports 190 and 191, respectively, and ports 194 and 195, respectively. The inlet ports 186 and 187 are interconnected by an inlet passage 135, the ports 188a and 189b are interconnected by a first outlet passage 140a, the ports 188b and 189a are interconnected by a second outlet passage 140b, and the ports 194 and 195 are interconnected by a connection passage 155.

The first plate 17 and the second plate 18 for implementing the passages 135, 140a, 140b and 155 are not explicitly shown to simply the drawings. The pilot supply for the first unitary valve 111 assembly is pulled from the inlet port 186, and the pilot supply for the second unitary valve assembly 112 is pulled from the inlet port 187. As the double valve 110 includes two outlet passages 140a and 140b, fluid can be directed to two different locations. For example, fluid can be directed to both ends of a cylinder 154 that requires pressure at both ends.

Figure 7A:
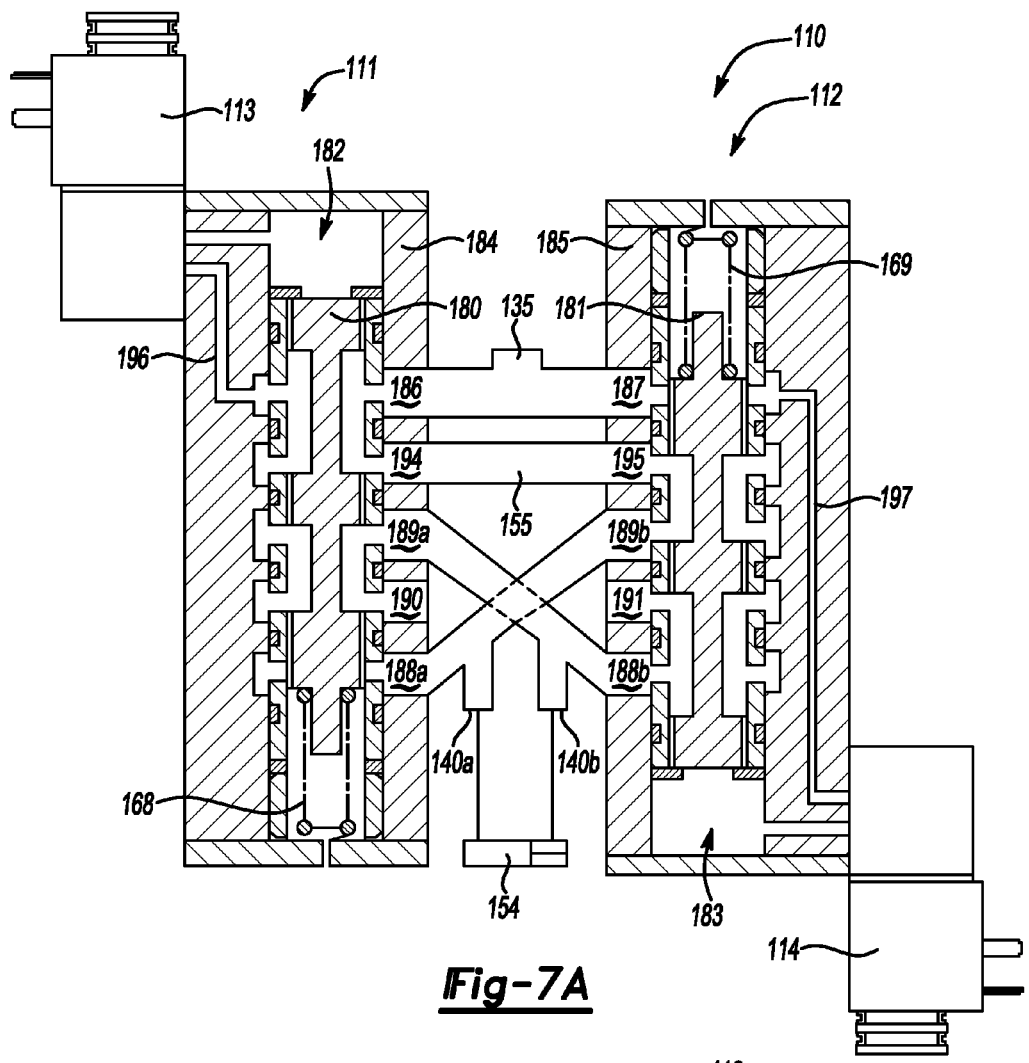
FIG. 7a is a side cross-sectional view of a double valve including 5/2 unitary valve assemblies in an initial, deactuated position.
Figure 7B:
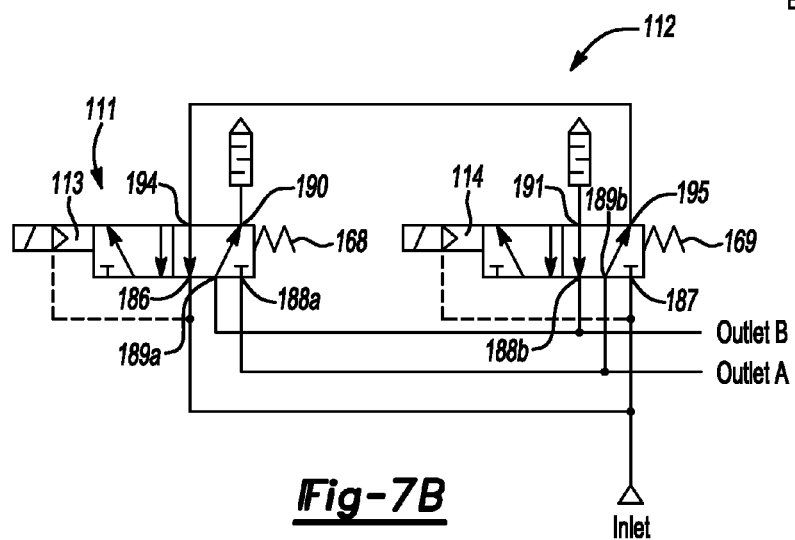
FIG. 7b is a pneumatic circuit diagram showing the double valve including 5/2 unitary valve assemblies in the deactuated position.

FIG. 7a shows the double valve 110 in an initial non-actuated position, and FIG. 7b shows a schematic representation of the pneumatic circuits of the double valve 110 in the initial, deactuated position. Both solenoid pilot valves 113 and 114 are non-energized. The fluid enters the inlet passage 135, flows from the inlet port 186 to the port 194, and flows through the connection passage 155 and through the port 195, and flows through the outlet port 189b and exits the double valve 110 through the first outlet passage 140a. In the initial position, the outlet passage 140a is pressurized, and fluid does not flow through the outlet passage 140b. As the solenoid pilot valves 113 and 114 are not actuated, fluid does not flow into the bores 182 and 183, and the bores 182 and 183 are not pressurized.

In the non-actuated position, the spool 181 blocks the inlet port 187, preventing the flow of fluid through the inlet port 187. Pressurized fluid enters the double valve 110 through the inlet passage 135, and the inlet ports 186 and 187 provide fluid to inlets of the solenoid pilot valves 113 and 114, respectively, via passages 196 and 197, respectively. However, as the solenoid pilot valves 113 and 114 are not energized, fluid does not enter the bores 182 and 183, respectively. Return resilient members 168 and 169 urge the spools 180 and 181, respectively, into the deactuated positions. In one example, the resilient members 168 and 169 are springs. The exhaust ports 190 and 191 are coupled to the outlet port 189a and the port 188b, respectively.

Figure 8A:
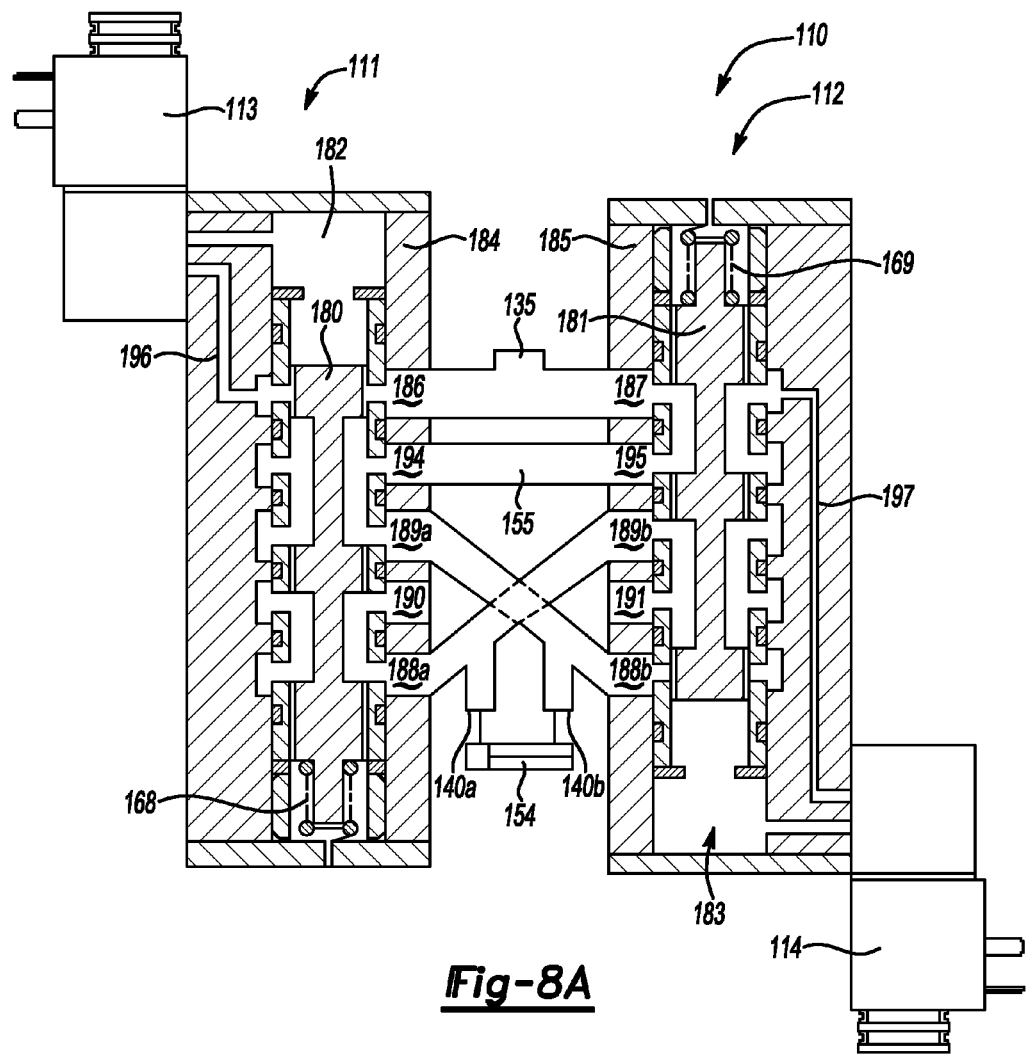
FIG. 8a is a side cross-sectional view of the double valve including 5/2 unitary valve assemblies in an actuated position.
Figure 8B:
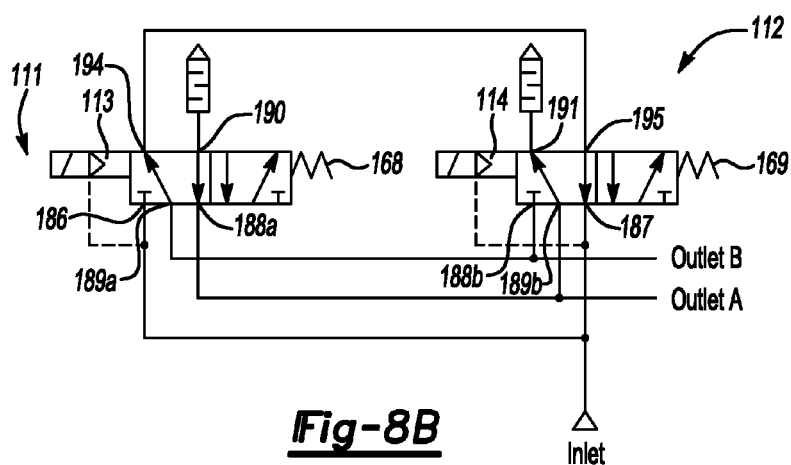
FIG. 8b is pneumatic circuit diagram showing the double valve including 5/2 unitary valve assemblies in the actuated position.

FIG. 8a shows the double valve 110 in the actuated position, and FIG. 8b shows a schematic representation of the pneumatic circuits of the double valve 110 in the actuated position. Both solenoid pilot valves 113 and 114 are energized. The fluid enters the inlet passage 135, flows from the inlet port 187 to the port 195, flows through the connection passage 155 to the port 194, and flows to the outlet port 189a and exits the double valve 110 through the second outlet passage 140b. In the actuated position, the outlet passage 140b is pressurized, and fluid does not flow through the outlet passage 140a. As the solenoid pilot valves 113 and 114 are actuated, fluid flows into the bores 182 and 183, and the bores 82 and 83 are pressurized.

When the solenoid pilot valves 113 and 114 are actuated, one or more electrical switches (not shown) supply a source of pressurized fluid. That is, when the double valve 110 is actuated, both solenoid pilot valves 113 and 114 are energized, and the passages 196 and 197 are pressurized, allowing the fluid to flow into the bores 182 and 183, moving the spools 180 and 181 to the actuated position against the bias of the resilient members 168 and 169, respectively.

Figure 9A:
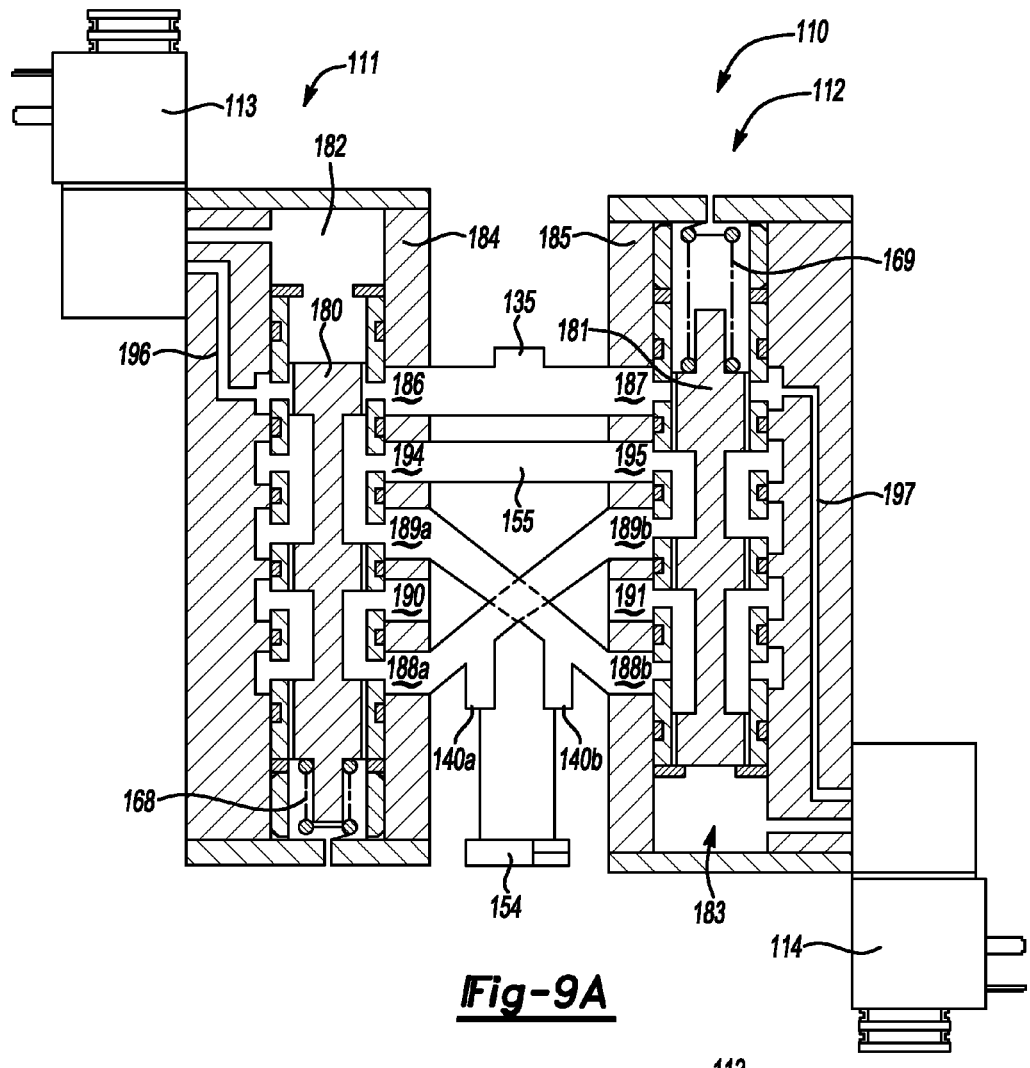
FIG. 9a is a side cross-sectional view of the double valve including 5/2 unitary valve assemblies in an errored and fail to safe position.
Figure 9B:
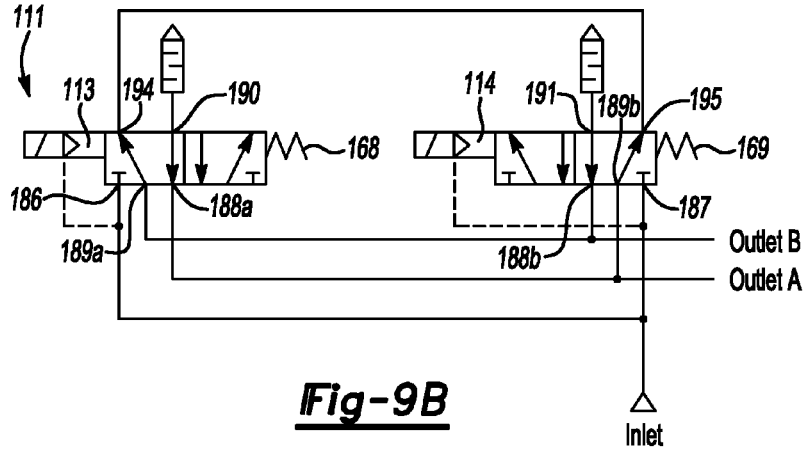
FIG. 9b is a pneumatic circuit diagram showing the double valve including 5/2 unitary valve assemblies in the errored and fail to safe position.
Figure 10A:
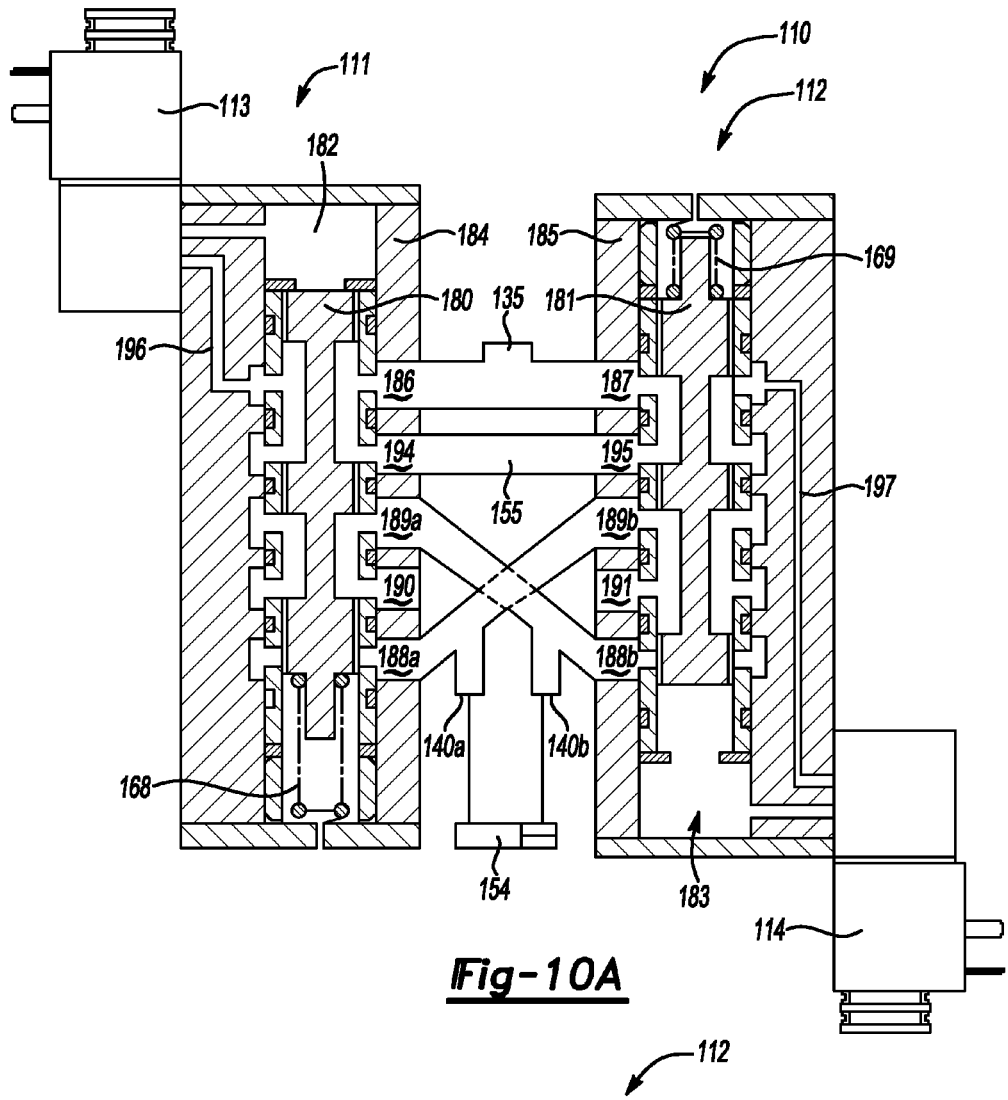
FIG. 10a is a side cross-sectional view of the double valve including 5/2 unitary valve assemblies in another errored and fail to safe position.
Figure 10B:
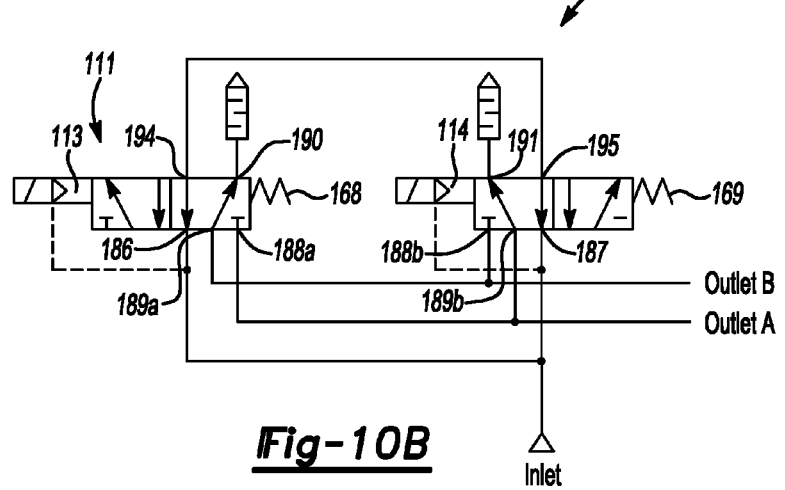
FIG. 10b is a pneumatic circuit diagram showing the double valve including 5/2 unitary valve assemblies in the another errored and fail to safe position.

FIGS. 9a and 10a show the double valve 10 in an errored and fail to safe position, and FIGS. 9b and 10b show a schematic representation of the pneumatic circuits of the double valve 110 in the errored and fail to safe position, for example when one of the spools 180 and 181 is not shifting properly. If there is a malfunction, the pressure is released from the double valve 110.

In FIGS. 9a and 9b, the first unitary valve assembly 111 is in the actuated position, and the second unitary valve assembly 112 is in the deactuated position. In one example, both solenoid pilot valves 113 and 114 are actuated, but the spool 180 sticks. This causes the bore 182 to become pressurized, actuating the spool 180. However, as the solenoid pilot valve 114 is not actuated, the spool 181 does not move to the actuated position as there is no pressure on the spool 181. The spools 180 and 181 block the inlet ports 186 and 187, respectively. Therefore, both outlets 140a and 140b are depressurized. Pressurized fluid in the double valve 110 in the connection passage 155 either 1) flows through the port 194, through the outlet port 189a and the port 189b, and exits the double valve 110 through the exhaust port 191 or 2) flows through the port 195, through the outlet port 189a and the port 188a and exits the double valve 110 through the exhaust port 190. Fluid can also exhaust through the outlet passage 140a and 140b. As a result, a pneumatic press or other equipment operated by the double valve 110 cannot actuate until the malfunction in the double valve 110 is corrected.

In FIGS. 10a and 10b, the first unitary valve assembly 111 is in the deactuated position, and the second unitary valve assembly 112 is in the actuated position. In one example, both solenoid pilot valves 113 and 114 are actuated, but the spool 181 sticks. This causes the bore 183 to become pressurized, actuating the spool 181. However, as the solenoid pilot valve 113 is not actuated, the spool 180 does not move to the actuated position as there is no pressure on the spool 180. Therefore, both of the outlet passages 140a and 140b are depressurized. Pressurized fluid in the double valve 110 either 1) flows through the port 188b, the outlet port 189b and exits the double valve 110 through the exhaust port 191 or 2) flows through the port 188a and the outlet port 189b and exits the double valve 110 through the exhaust port 190. Fluid can also exhaust through the outlet passages 140a and 140b. As a result, a pneumatic press or other equipment operated by the double valve 110 cannot be actuated until the malfunction in the double valve 110 is corrected.

FIGS. 11a, 11b and 12 to 17 illustrate a double valve 210. The first and second unitary valve assemblies 211 and 212 include spools 280 and 281, respectively, received in longitudinal bores 282 and 283, respectively, of valve bodies 284 and 285, respectively. Using FIG. 11a as a reference, an upper portion 282a and 283a of the bores 282 and 283, respectively, is located above the spools 280 and 280, respectively, and a lower portion 282b and 283b of the bores 282 and 283, respectively, is located below the spools 280 and 281, respectively. A resilient member 268a, 268b, 269a and 269b is located in each of the portions 282a, 282b, 283a and 283b, respectively, to provide a force to the respective spool 280 and 281. In one example, the resilient members 268a, 268b, 269a and 269b are springs. The first and second unitary valve assemblies 211 and 212 are 5 port, 3 position valves (5/3-way valves).

The double valve 210 includes an inlet port 286 and an exhaust port 287. The second unitary valve assembly 212 includes a first outlet port 289, a second outlet port 291, the first unitary valve assembly 211 includes ports 288 and 290, and the first and second unitary valve assemblies 211 and 212 include first ports 292 and 293, respectively, and second ports 294 and 295, respectively. The first outlet port 289 and the port 288 in communication with a first outlet passage 240, and the second outlet port 291 and the port 290 are in communication with a second outlet passage 241. The first ports 292 and 293 are in communication with a first passage 255, and the second ports 294 and 295 are in communication with a second passage 256. The first plate 17 and the second plate 18 for implementing the passages 240, 241, 255 and 256 are not explicitly shown to simply the drawings.

The first unitary valve assembly 211 includes two pilot solenoid valves 213a and 213b, and the second unitary valve assembly 212 includes two pilot solenoid valves 214a and 214b. The spools 280 and 281 are movable between three positions: a central position, a lowered position, and a raised position. The central position is between the lowered position and the raised position. The resilient members 268a, 268b, 269a and 269b bias the spools 280 and 281 to the central position. As the double valve 210 includes two outlet passages 240a and 240b, fluid can be directed to two different sources. For example, fluid can be directed to both ends of a cylinder 254 that requires pressure at both ends. An indicator 257 separates the ends of the cylinder 245. Under normal conditions, the outlet passages 240 and 241 are closed.

Figure 11A:
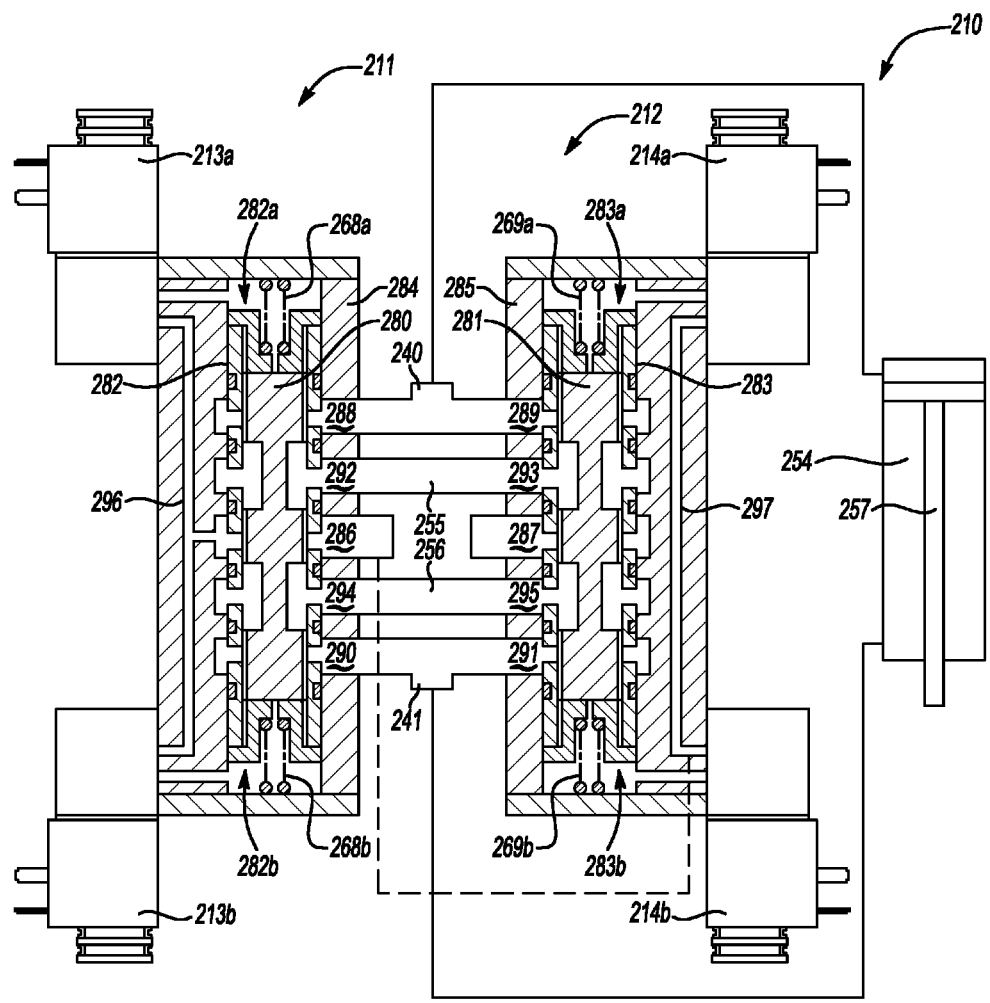
FIG. 11a is a side cross-sectional view of double valve including 5/3 unitary valve assemblies in an initial, deactuated position.
Figure 11B:
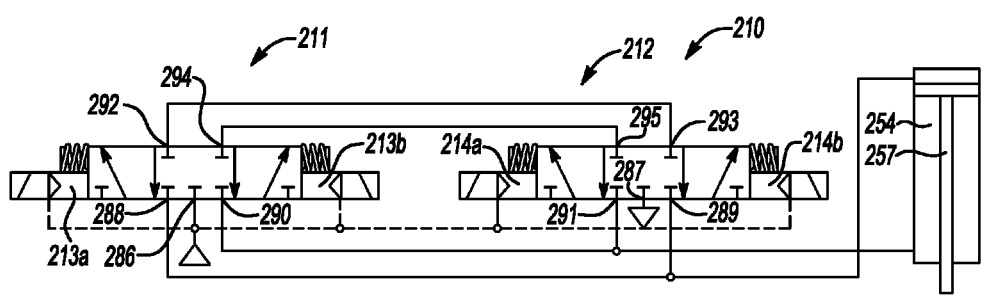
FIG. 11b is a pneumatic circuit diagram showing the double valve including 5/3 unitary valve assemblies in the deactivated position.

FIG. 11a shows the double valve 210 in an initial position, and FIG. 11b shows a schematic representation of the pneumatic circuits of the double valve 210 in the initial position. In the initial position, fluid does not flow through the double valve 210. The spools 280 and 281 are in the first central position. The pilot solenoid valves 213a, 213b, 214a and 214b are not energized. The spool 280 and 281 are not in the central position, and the pressure is trapped in the outlet passages 240 and 241. If there is a malfunction, the pressure is released from the double valve 210.

Figure 12:
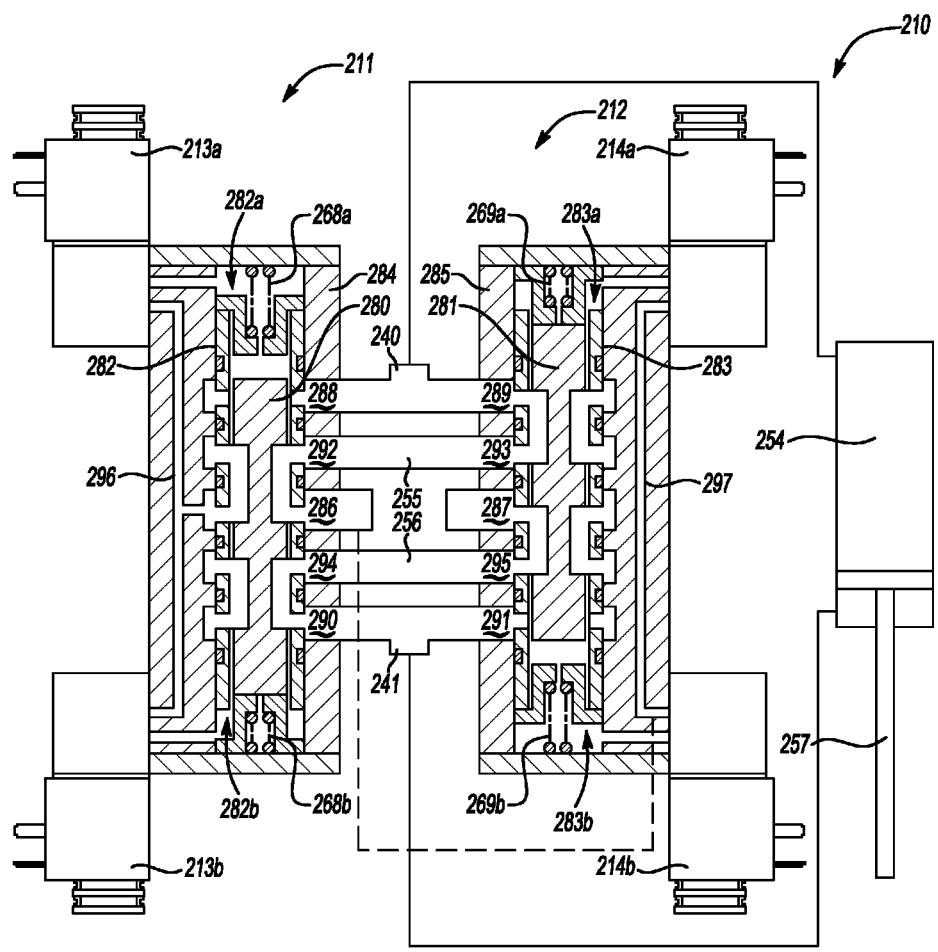
FIG. 12 is a side cross-sectional view of the double valve including 5/3 unitary valve assemblies in a first actuated position.

FIG. 12 illustrates the double valve 210 in a first actuated position. The pilot solenoid valves 213a and 214b are energized, providing pressure to the bores 282a and 283b. Pressurized fluid enters the double valve 210 through the inlet port 286 and is provided to respective inlets of the solenoid pilot valves 213a and 214b via passages 296 and 297. The spool 280 is biased from the central position to the lower position, and the spool 281 is biased from the central position to the raised position, compressing the resilient members 268b and 269a, respectively. The fluid flows from the inlet port 286 to the port 292, through the first passage 255, to the port 293, to the first outlet port 289 and exits the double valve 210 through the outlet passage 240, which is pressurized. Air in the second passage 256 is exhausted through the outlet passage 241, which is non-pressurized.

Figure 13:
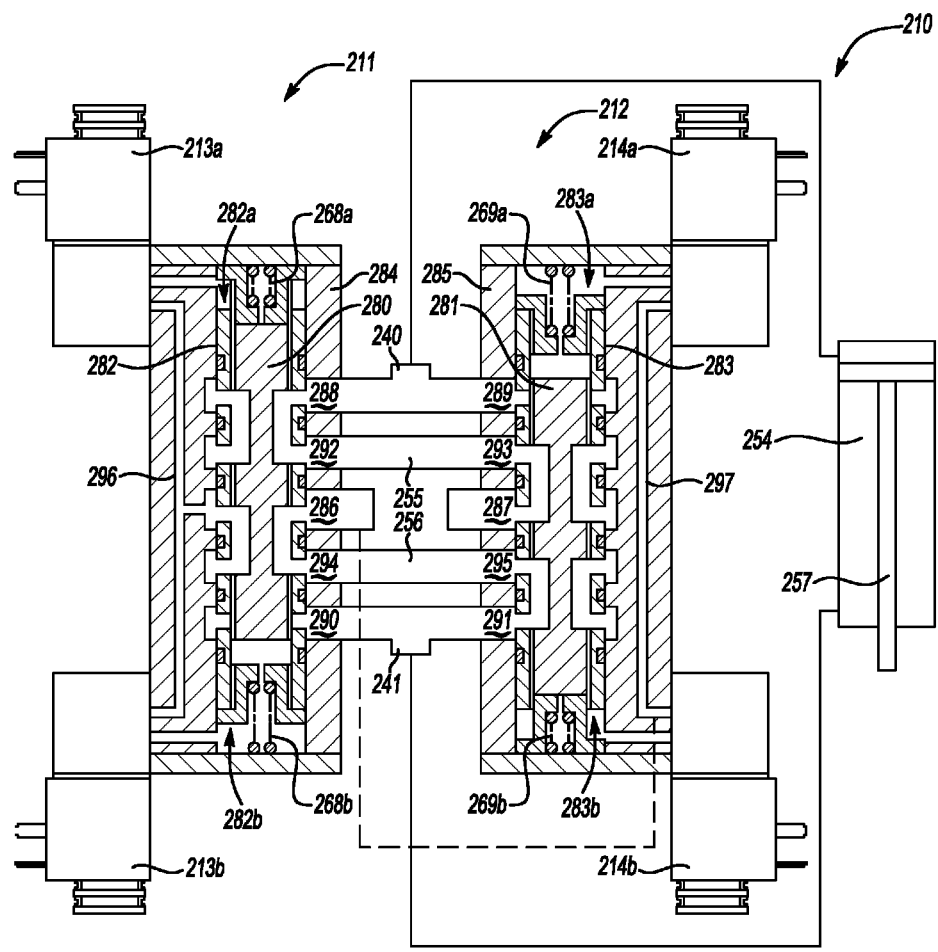
FIG. 13 is a side cross-sectional view of the double valve including 5/3 unitary valve assemblies in a second actuated position.

FIG. 13 illustrates the double valve 210 in a second actuated position. The pilot solenoid valves 213b and 214a are energized, providing pressure to the portions 282b and 283a. Pressurized fluid enters the double valve 210 through the inlet port 286 and is provided to respective inlets of the pilot solenoid valves 213b and 214a via passages 296 and 297, respectively. The spool 280 is biased from the central position to the raised position, and the spool 281 is biased from the central position to the lowered position, compressing the resilient members 268a and 269b respectively. The fluid flows from the inlet port 286 to the port 294, through the second passage 256, through the port 295, through the second outlet port 291 and exits the double valve 210 through the outlet passage 241, which is pressurized. Air in the first passage 255 is exhausted through the outlet passage 240, which is non-pressurized.

When the signals from the solenoid pilot valves 213a, 213b, 214a and 214b are removed, the spools 280 and 281 should return to the central position and trap pressure at the outlets 240 and 241. If a malfunction occurs, due to, for example, the incorrect shifting of one of the spools 280 and 281, the double valve 210 operates in a closed center position, trapping pressure at both the outlet passages 240 and 241, resulting in no motion of the actuator. Therefore, fluid does not pass through the double valve 210.

Figure 14:
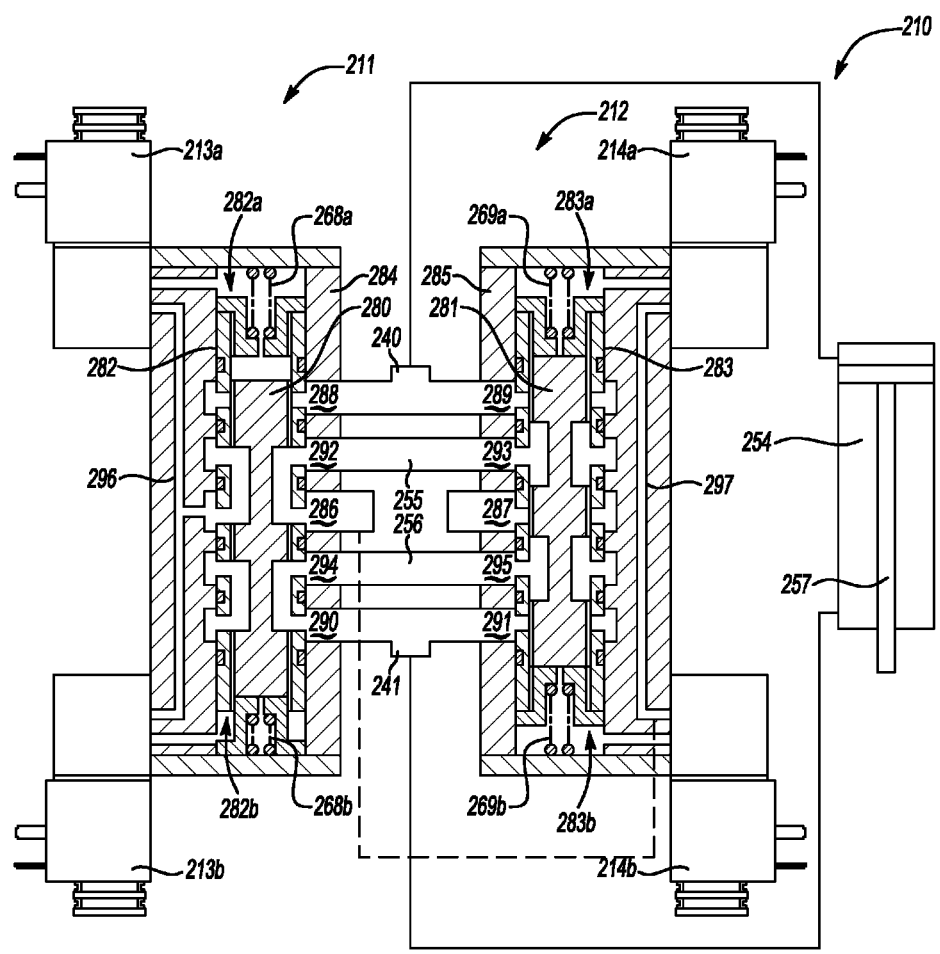
FIGS. 14 to 19 are side cross-sectional views of the double valve including 5/3 unitary valve assemblies in various errored and fail to safe positions.

FIG. 14 illustrates the double valve 210 in an errored and fail to safe condition. The spool 280 is in the lowered position, and the spool 281 is in the central position. Fluid enters the inlet port 286 and flows to the port 292, through the first passage 255, and to the port 293, blocking further flow of the fluid. The pilot solenoid valve 213a is energized, providing pressure to the bore 282a that maintains the spool 280 in the lowered position. Pressure is trapped in both of the outlet passages 240 and 241.

Figure 15:
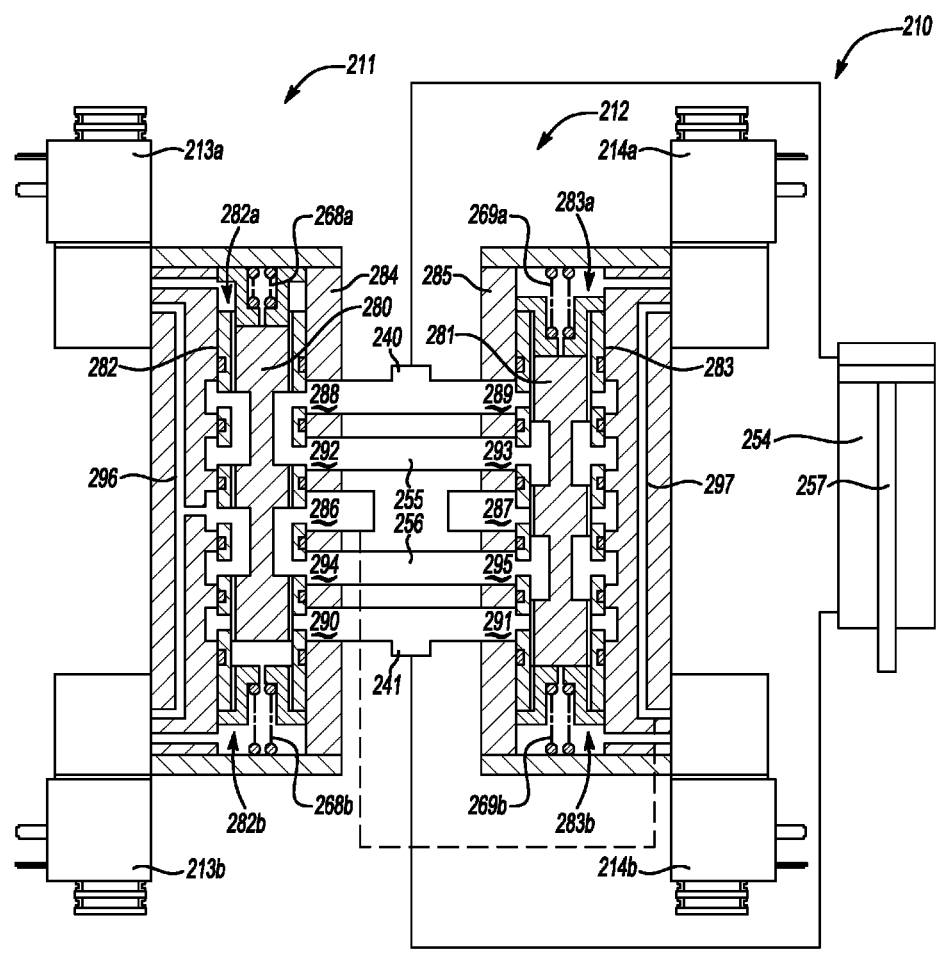

FIG. 15 illustrates the double valve 210 in another errored and fail to safe condition. The spool 280 is in the raised position, and the spool 281 is in the central position. Fluid enters the inlet port 286 and flows to the port 294, through the second passage 256, and to the port 295, blocking further flow of the fluid. The pilot solenoid valve 213b is energized, providing pressure to the bore 282b, maintaining the spool 280 in the raised position. Pressure is trapped in both the outlet passages 240 and 241.

Figure 16:
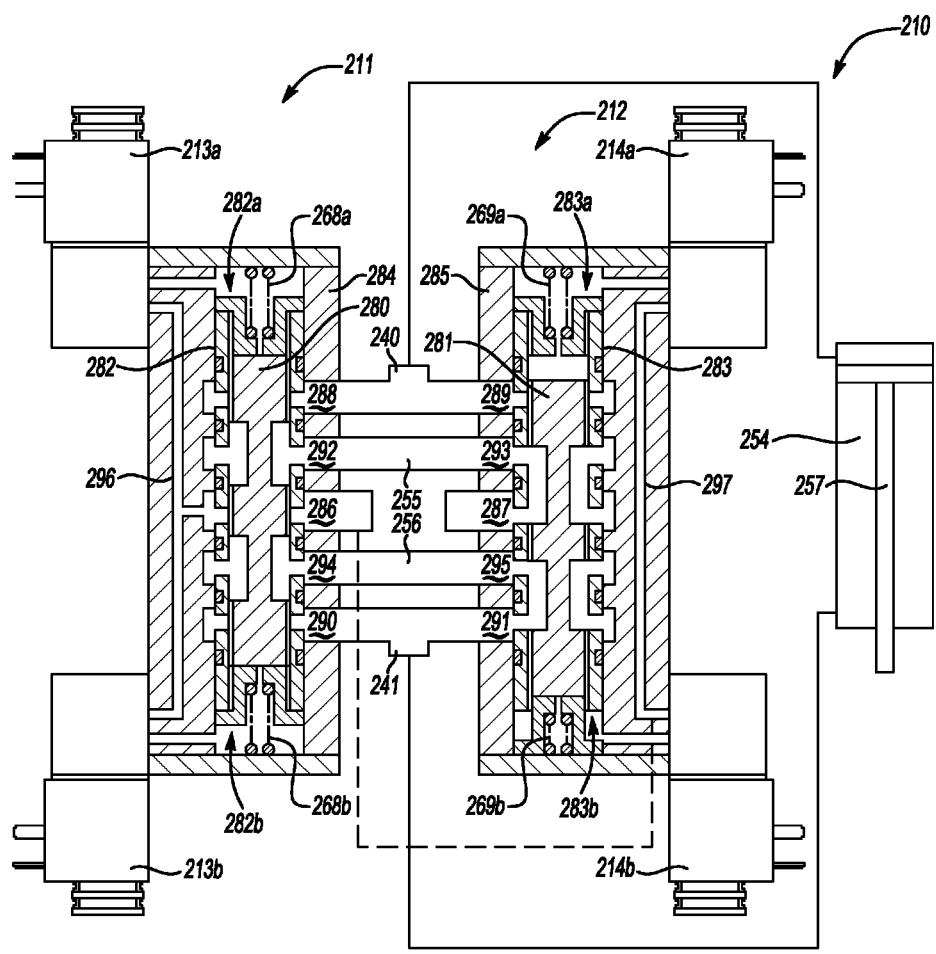

FIG. 16 illustrates the double valve 210 in another errored and fail to safe condition. The spool 280 is in the central position, and the spool 281 is in the lowered position. Fluid enters the inlet port 286 and is blocked from further flow by the spool 280. The pilot solenoid valve 214a is energized, providing pressure to the portion 283a, maintaining the spool 281 in the lowered position. Pressure is trapped in both the outlet passages 240 and 241.

Figure 17:
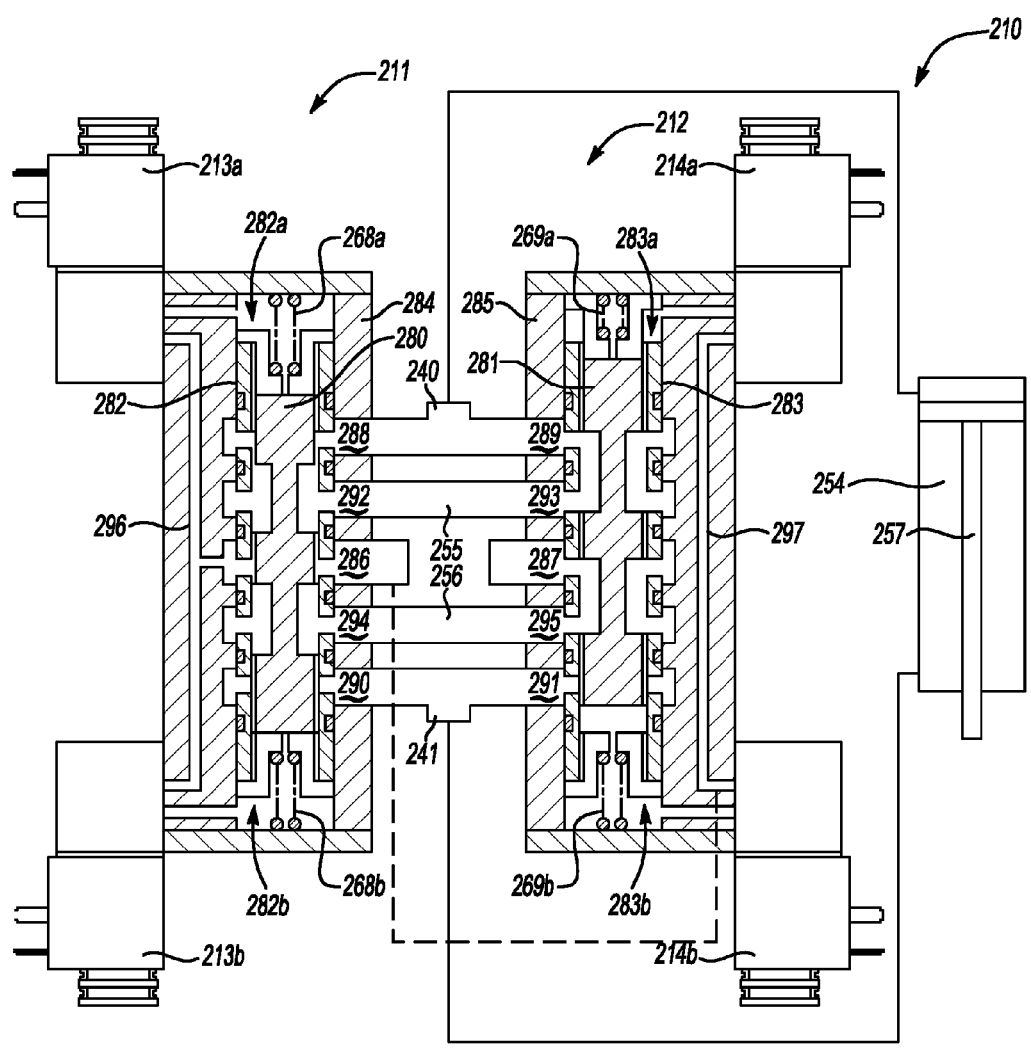

FIG. 17 illustrates the double valve 210 in another faulted condition. The spool 280 is in the central position, and the spool 281 is in the raised position. Fluid enters the inlet port 286 and is blocked from further flow by the spool 280. The pilot solenoid valve 214b is energized, providing pressure to the chamber 283b, maintaining the spool 281 in the raised position. Pressure is trapped in both the outlet passages 240 and 241.

Figure 18:
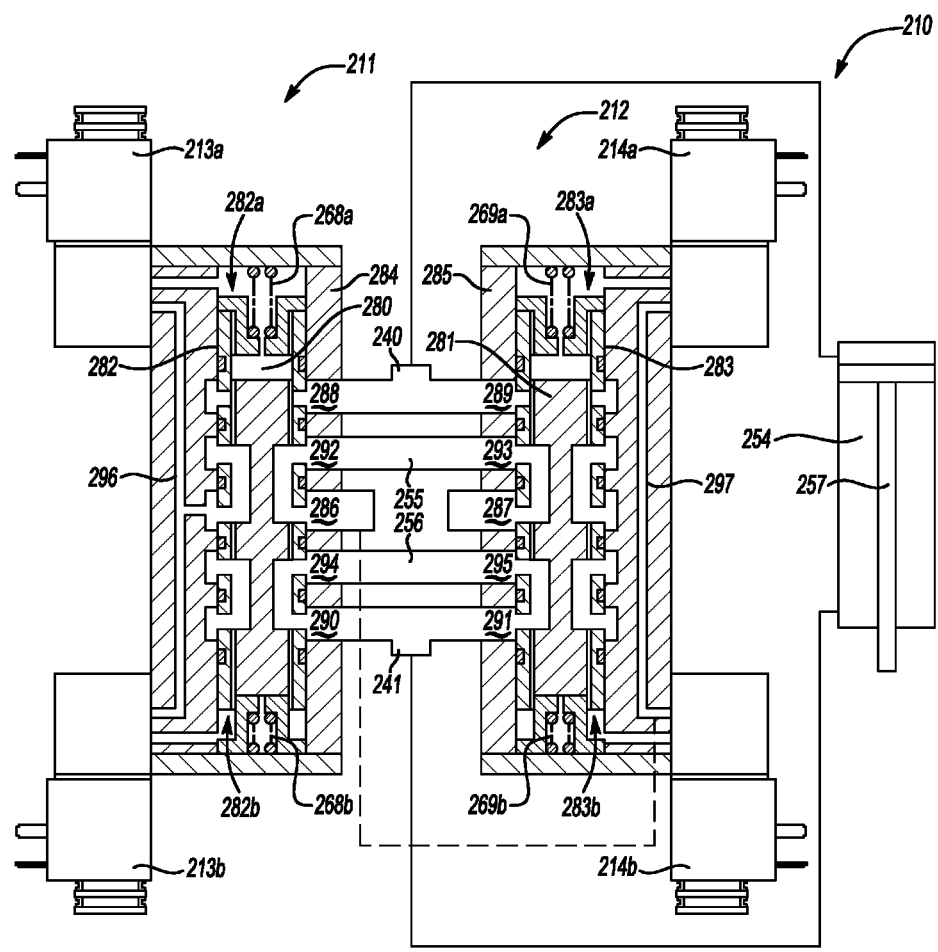

FIG. 18 illustrates the double valve 210 in another errored and fail to safe condition. The spools 280 and 281 are in the lowered position. Fluid enters the inlet port 286 and flows to the port 292 and through the first passage 255, blocking further flow of the fluid. When a malfunction occurs, any fluid left in the passage can exhaust through the exhaust port 287. The pilot solenoid valves 213a and 214a are energized, providing pressure to the bore 282a and 2823a, respectively, maintaining the spools and 280 and 281 in the lowered position. Pressure is trapped in both the outlet passages 240 and 241.

Figure 19:
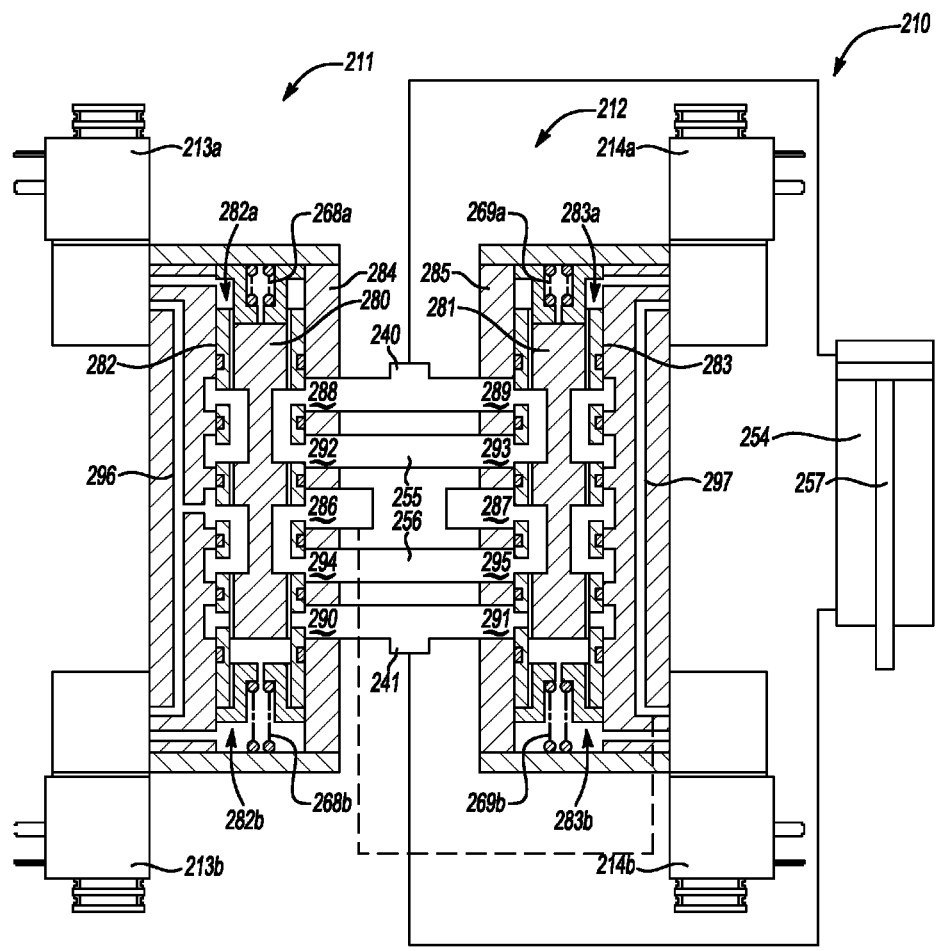

FIG. 19 illustrates the double valve 210 in another errored and fail to safe condition. The spools 280 and 281 are in the raised position. Fluid enters the inlet port 286 and flows to the port 294 and through the passage 256, blocking further flow of the fluid. When a malfunction occurs, any fluid left in the passage can exhaust through the exhaust port 287. The spool 281 blocks further flow of the fluid. The pilot solenoid valves 213b and 214b are energized, providing pressure to the bores 282b and 283b, respectively, maintaining the spools 280 and 281 in the raised position. Pressure is trapped in both the outlet passages 240 and 241.

FIGS. 20a to 23b illustrate another double valve 310. The first and second unitary valve assemblies 311 and 312 each include spools 380 and 381, respectively, received in longitudinal bores 382 and 383, respectively, of valve bodies 384 and 385, respectively. Using FIG. 20a as a reference, a bore 382 is located above the spools 380, and a bore 382 is located below the spool 381. A resilient member 368 and 369 provides a force to the respective spool 380 and 381 to bias the spools 380 and 381, respectively, to an initial condition. In one example, the resilient members 368 and 369 are springs. The first and second unitary valve assemblies 311 and 312 are 5 port, 2 position valves (5/2-way valves).

The double valve 310 includes an inlet port 386 and an exhaust port 387, and the second unitary valve assembly 312 includes a first outlet port 389 and a second outlet port 391, the first unitary valve assembly 311 includes ports 390 and 388, and the first and second unitary valve assemblies 311 and 312 include first ports 392 and 393, respectively, and second ports 394 and 395, respectively. The first outlet port 389 and the port 388 define a first outlet passage 340, and the second outlet port 391 and the port 390 define a second outlet passage 341. The first ports 392 and 393 are in communication with a first passage 355, and the second ports 394 and 395 are in communication with a second passage 356. The first plate 17 and the second plate 18 for implementing the passages 340, 341, 355 and 356 are not explicitly shown to simply the drawings.

The unitary valve assembly 211 and 212 includes pilot solenoid valve 313 and 314, respectively. The spools 381 and 381 are movable between an initial position and an actuated position. The resilient members 328 and 369 bias the spools 380 and 381 to the initial position. A cylinder 354 including an indicator 357 shows the distribution of the pressure. As the double valve 310 includes the two outlet passages 340 and 341, fluid can be directed to two different sources. For example, fluid can be directed to both ends of a cylinder 354 that requires pressure at both ends. An indicator 357 separates the ends of the cylinder 345. Under normal conditions, the outlet passages 340 and 341 are closed.

Figure 20A:
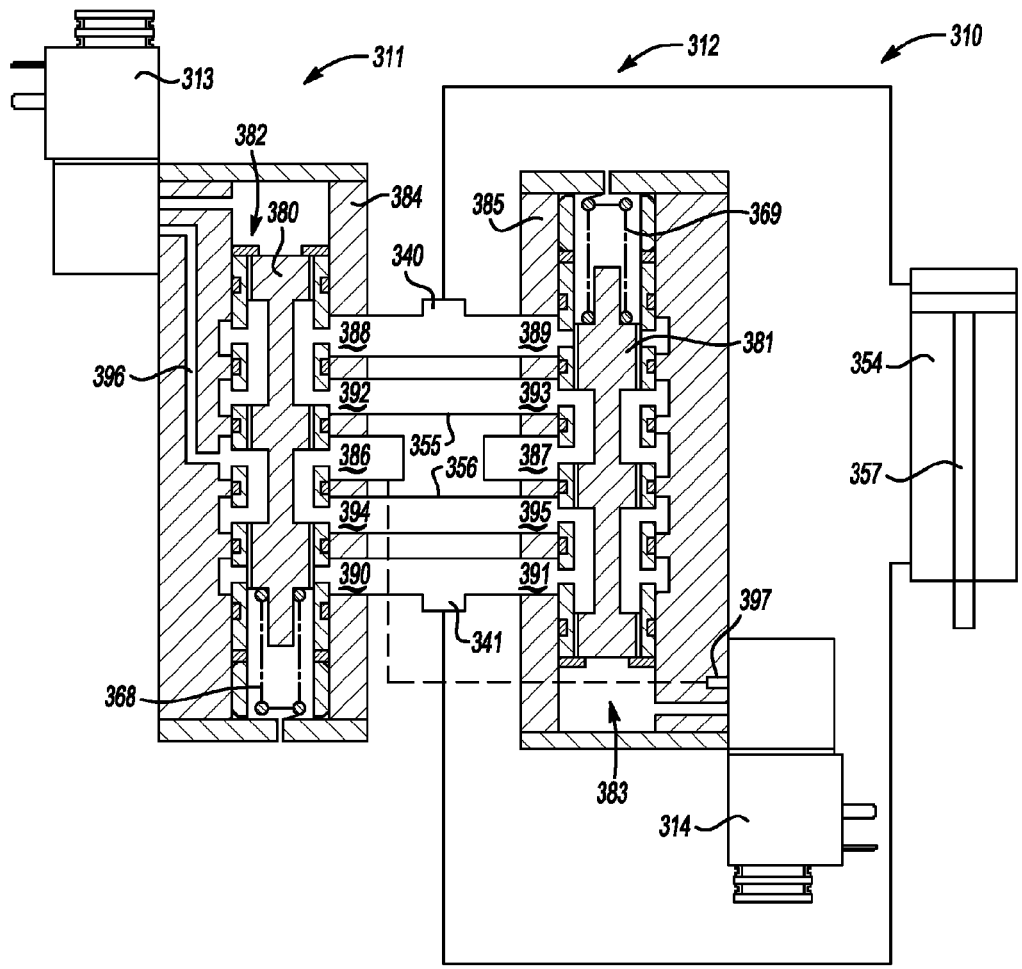
FIG. 20a is a side cross-sectional view of the double valve including 5/2 unitary valve assemblies in an initial position.
Figure 20B:
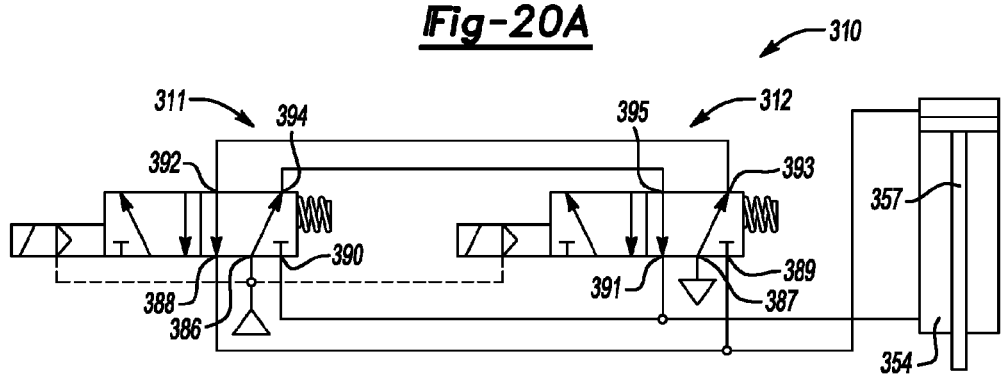
FIG. 20b is a pneumatic circuit diagram showing the double valve including 5/2 unitary valve assemblies in the initial position.

FIG. 20a shows the double valve 310 in an initial position, and FIG. 20b shows a schematic representation of the pneumatic circuits of the double valve 310 in the initial position. In the initial position, the pilot solenoid valves 313 and 314 are not energized. The resilient members 368 and 368 bias the spools 380 and 381, respectively, to the initial position. Pressurized fluid enters the double valve 310 through the inlet port 386 and is provided to respective inlets of the solenoid pilot valves 313 and 314 via passages 396 and 397, respectively. The pressurized fluid enters the double valve 310 through the inlet port 386, flows to the second port 394, flows through the second passage 356 to the second port 395, flows to the second outlet port 391, and exits the double valve 310 through the outlet passage 340, which is pressurized. The non-pressurized is exhausted through the outlet passage 340. This is reflected in the cylinder 354 and the indicator 357.

Figure 21A:
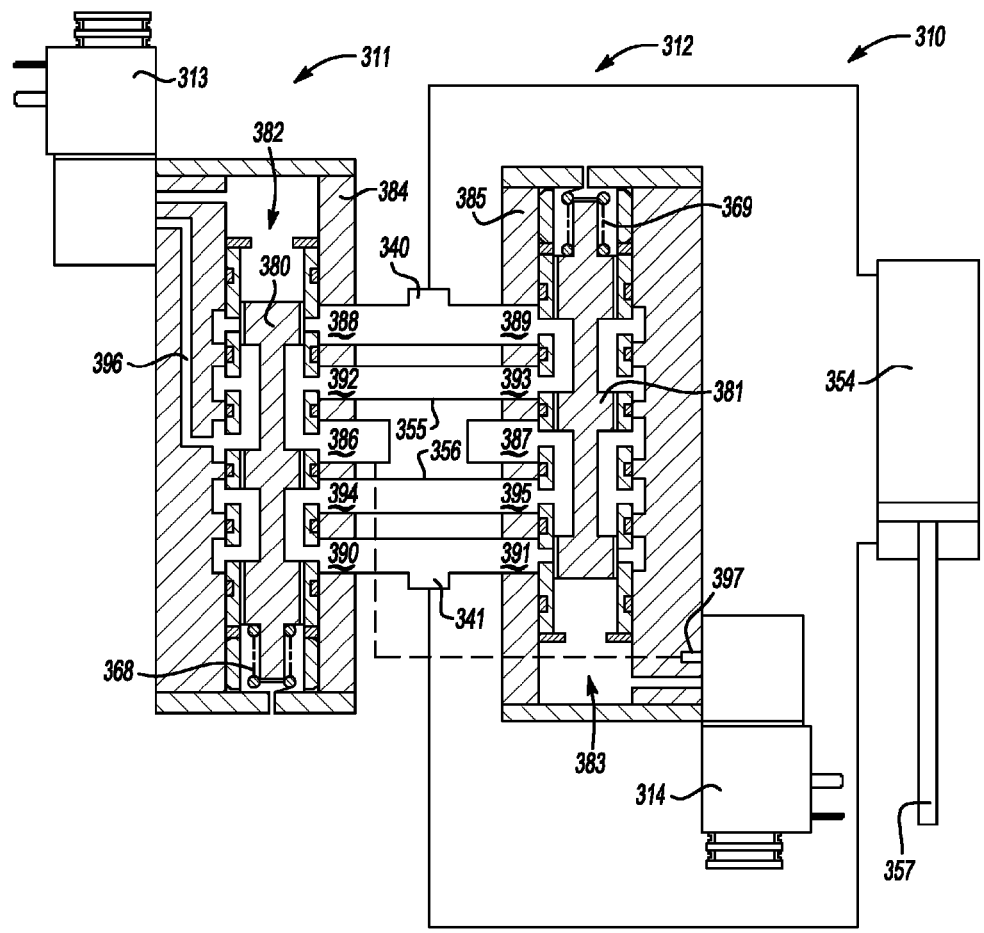
FIG. 21a is a side cross-sectional view of the double valve including 5/2 unitary valve assemblies in an actuated position.
Figure 21B:
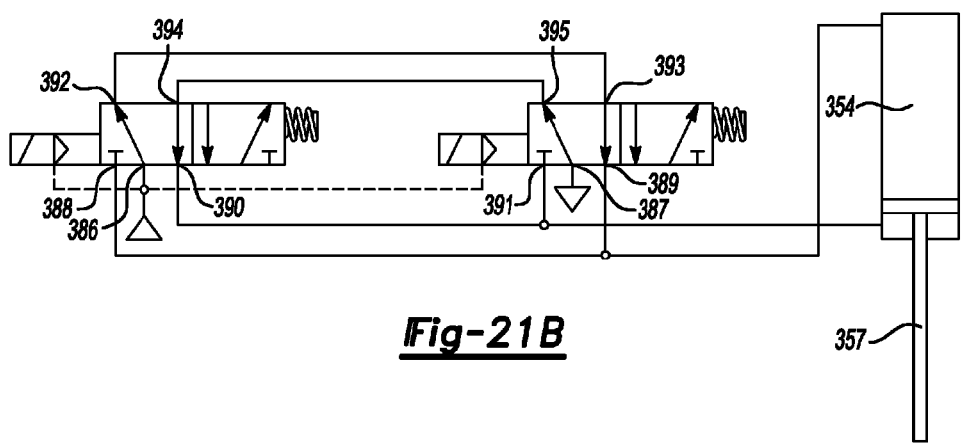
FIG. 21b is a pneumatic circuit diagram showing the double valve including 5/2 unitary valve assemblies in the actuated position.

FIG. 21a illustrates the double valve 310 in an actuated position, and FIG. 21b shows a schematic representation of the pneumatic circuits of the double valve 310 in the actuated position. In the actuated position, the pilot solenoid valves 313 and 314 are energized, providing pressure to the bores 382 and 383. Pressurized fluid enters the double valve 310 through the inlet port 386 and is provided to respective inlets of the solenoid pilot valves 313 and 314 via passages 396 and 297, respectively. The inlet port 386 is in communication with both the passage 296 and 297, respectively, pressurizing the bores 382 and 383, respectively, against the bias of the resilient member 368 and 369, respectively, to the actuated position. The pressurized fluid enters the double valve 310 through the inlet port 386, flows to the first port 392, flows through the first passage 355 to the first port 393, flows to the first outlet port 389, and exits the double valve 310 through the outlet passage 341, which is pressurized. The non-pressurized is exhausted through the outlet passage 341.

Figure 22A:
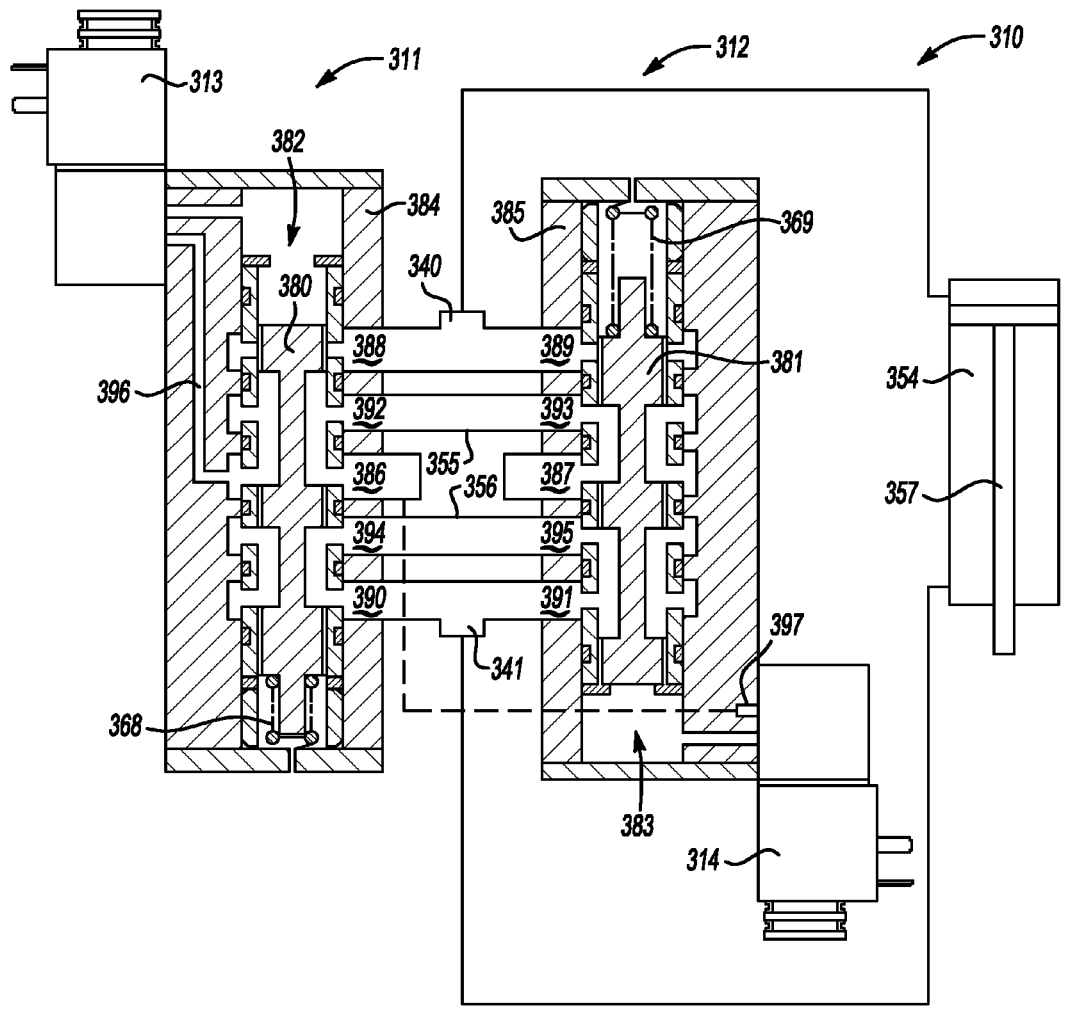
FIG. 22a is a side cross-sectional view of the double valve including 5/2 unitary valve assemblies in an errored and fail to safe position.
Figure 22B:
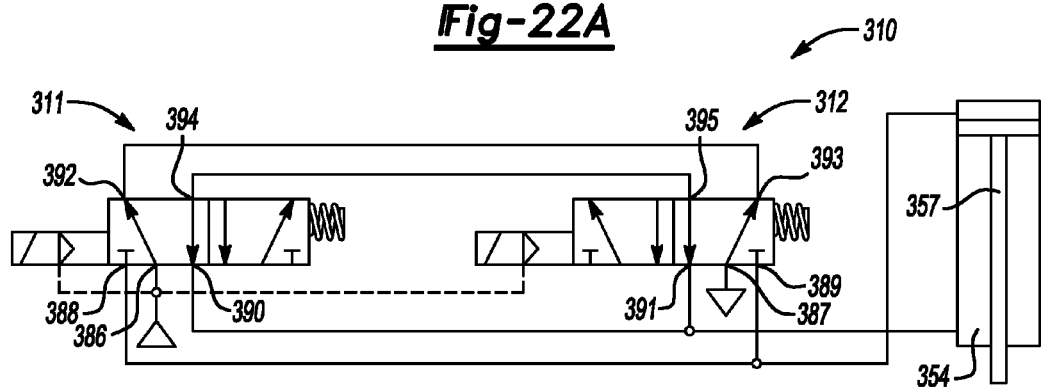
FIG. 22b is a pneumatic circuit diagram showing the double valve including 5/2 unitary valve assemblies in the errored and fail to safe position.

FIG. 22a illustrates the double valve 310 in an errored and fail to safe position, and FIG. 22b shows a schematic representation of the pneumatic circuits of the double valve 310 in the errored and fail to safe position. The pilot solenoid valve 313 is energized, providing pressure to the bore 382, maintaining the spool 380 in the actuated position. The spool 381 is in the initial position. In this position, fluid enters the inlet port 386 and flows to the first port 392, flows through the second passage 356, flows to the first port 393, and flows to the exhaust port 387, where the fluid is exhausted. Pressure is trapped in both of the outlet passages 340 and 341.

Figures 23A, 23B:
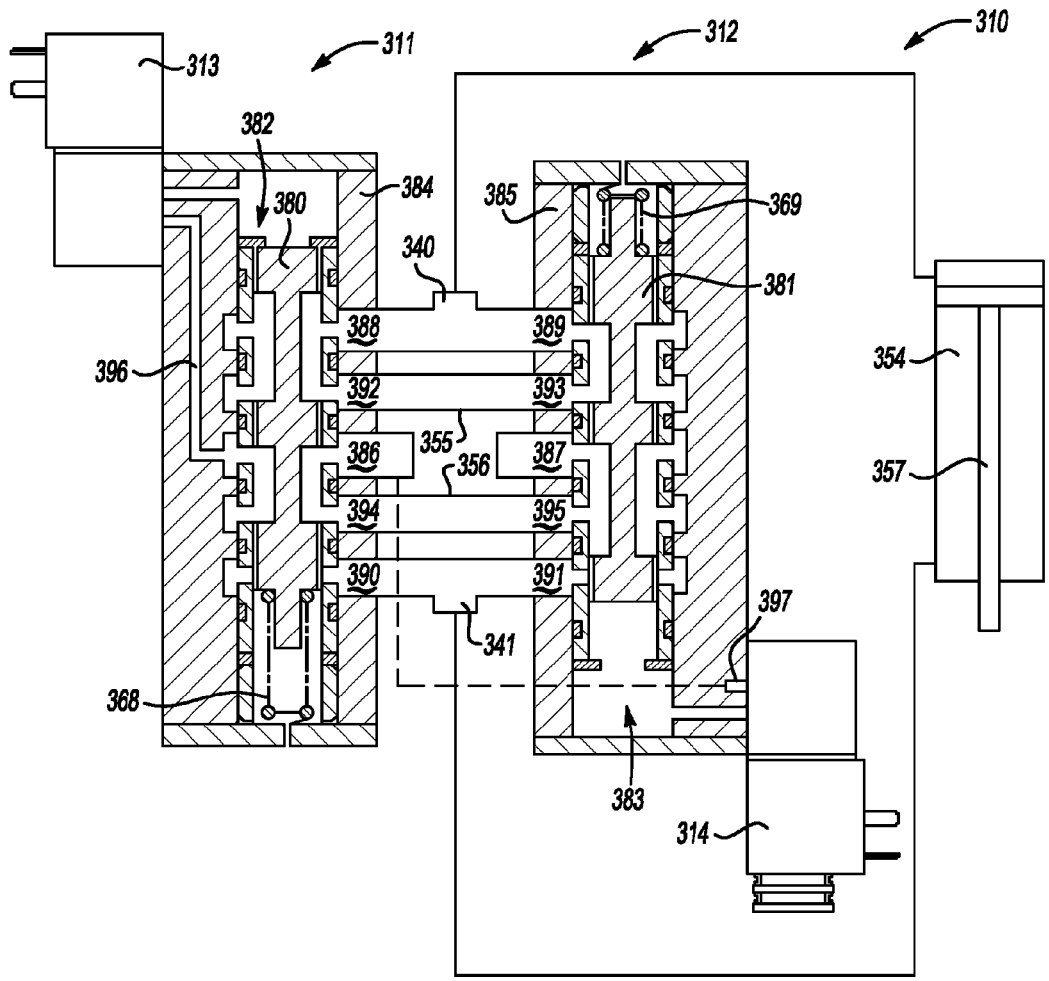
FIG. 23a is a side cross-sectional view of the double valve including 5/2 unitary valve assemblies in another errored and fail to safe position.
FIG. 23b is a pneumatic circuit diagram showing the double valve including 5/2 unitary valve assemblies in the another errored and fail to safe position.

FIG. 23a illustrates the double valve 310 in another errored and fail to safe position, and FIG. 23b shows a schematic representation of the pneumatic circuits of the double valve 310 in the another errored and fail to safe position. The pilot solenoid valve 314 is energized, providing pressure to the bore 282, maintaining the spool 381 in the actuated position. The spool 380 is in the initial position. In this position, fluid enters the inlet port 386 and flows to the second port 394, flows through the first passage 355, flows to the second port 395, and flows to the exhaust port 387, wherein the fluid is exhausted. Pressure is trapped in both of the outlet passages 340 and 341.

By employing a valve 110, 210 and 310 with two outlet passages, fluid can be directed to two sources.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A double valve comprising:
    a first unitary valve assembly including a first outlet port, a second outlet port, and a first spool;
    a second unitary valve assembly including another first outlet port, another second outlet port and a second spool;
    a first pilot assembly coupled to the first unitary valve assembly;
    a second pilot assembly coupled to the second unitary valve assembly;
    a plate coupled to the first unitary valve assembly and the second unitary valve assembly, the plate including respective passages to provide a first common outlet passage coupled to the first outlet port and the another first outlet port and a second common outlet passage coupled to the second outlet port and the another second outlet port; and
    an inlet passage, wherein the first position is an initial position and the second position is an actuated position, and the fluid enters the double valve through the inlet passage,
    wherein the fluid exits the double valve through the first common outlet passage when the first spool and the second spool are in the initial position, and the fluid exits the double valve through the second common outlet passage when the first spool and the second spool are in the actuated position
    wherein when the first spool and the second spool are in a first position, fluid flows through the first common outlet passage, and when the first spool and the second spool are in a second position, the fluid flows through the second common outlet passage, and wherein, when one of the first spool and the second spool is in the initial position and the other of the first spool and the second spool is in the actuated position, the double valve malfunctions, and the fluid does not flow through either the first common outlet passage or the second common outlet passage.

2. A double valve comprising:

a first unitary valve assembly including a first outlet port, a second outlet port, and a first spool;

a second unitary valve assembly including another first outlet port, another second outlet port and a second spool;

a first pilot assembly coupled to the first unitary valve assembly;

a second pilot assembly coupled to the second unitary valve assembly;

a plate coupled to the first unitary valve assembly and the second unitary valve assembly, the plate including respective passages to provide a first common outlet passage coupled to the first outlet port and the another first outlet port and a second common outlet passage coupled to the second outlet port and the another second outlet port;

an inlet passage, wherein the first position is a first actuated position and the second position is a second actuated position, the fluid enters the double valve through the inlet passage, and the first spool and the second spool further include a third position located between the first position and the second position, wherein the third position is an initial position, wherein, when the first spool and the second spool are in a first position, fluid flows through the first common outlet passage, and when the first spool and the second spool are in a second position, the fluid flows through the second common outlet passage, and wherein the fluid exits the double valve through the first common outlet passage when the first spool and the second spool are in the first actuated position, and the fluid exits the double valve through the second common outlet passage when the first spool and the second spool are in the second actuated position, and the fluid does not exit the double valve through either the first common outlet passage or the second common outlet passage when the first spool and the second spool are in the initial position.

3. The double valve as recited in claim 2 including a first solenoid pilot valve and another first solenoid pilot valve associated with the first unitary valve assembly and a second solenoid pilot valve and another second solenoid pilot valve associated with the second unitary valve assembly, wherein energization of the first solenoid pilot valve and the another second solenoid pivot valve moves the first spool and the second spool to the first actuated position, and energization of the another first solenoid pilot valve and the second solenoid pivot valve moves the first spool and the second spool to the second actuated position.

4. The double valve as recited in claim 2 wherein a first resilient member and a second resilient member biases the first spool and the second spool, respectively, to the initial position.

5. The double valve as recited in claim 2 wherein, when one of the first spool and the second spool is in the initial position and the other of the first spool and the second spool is in one of the first actuated position and the second actuated position, the double valve malfunctions, and the fluid does not exit the double valve through either the first common passage or the second common outlet passage.

6. The double valve as recited in claim 2 wherein, when one of the first spool and the second spool is in one of the first actuated position and the second actuated position, and the other of the first spool and the second spool is in the other of the first actuated position and the second actuated position the double valve malfunctions, and the fluid does not exit the double valve through either the first common outlet passage or the second common outlet passage.

7. A pneumatically powered machine tool comprising:

a cylinder including a first end and a second end; and a double valve including a first unitary valve assembly including a first outlet port, a second outlet port, and a first spool, a second unitary valve assembly including another first outlet port, another second outlet port and a second spool, a first pilot assembly coupled to the first unitary valve assembly, a second pilot assembly coupled to the second unitary valve assembly, and a plate coupled to the first unitary valve assembly and the second unitary valve assembly, the plate including respective passages to provide a first common outlet passage coupled to the first outlet port and the another first outlet port and a second common outlet passage coupled to the second outlet port and the another second outlet port, wherein, when the first spool and the second spool are in a first position, fluid flows through the first common outlet passage to the first end of the cylinder, and when the first spool and the second spool are in a second position, the fluid flows through the second common outlet passage to the second end of the cylinder.

8. The double valve as recited in claim 7 including an inlet passage, wherein the first position is an initial position and the second position is an actuated position, and the fluid enters the double valve through the inlet passage, wherein the fluid exits the double valve through the first common outlet passage when the first spool and the second spool are in the initial position, and the fluid exits the double valve through the second common outlet passage when the first spool and the second spool are in the actuated position.

9. The double valve as recited in claim 8 including a first solenoid pilot valve associated with the first unitary valve assembly and a second solenoid pilot valve associated with the second unitary valve assembly, wherein energization of the first solenoid pilot valve and the second solenoid pilot valve moves the first spool and the second spool, respectively, to the actuated position.

10. The double valve as recited in claim 8 wherein, when one of the first spool and the second spool is in the initial position and the other of the first spool and the second spool is in the actuated position, the double valve malfunctions, and the fluid does not flow through either the first common outlet passage or the second common outlet passage.

11. The double valve as recited in claim 7 including an inlet passage, wherein the first position is a first actuated position and the second position is a second actuated position, the fluid enters the double valve through the inlet passage, and the first spool and the second spool further include a third position located between the first position and the second position, wherein the third position is an initial position, wherein fluid exits the double valve through the first common outlet passage when the first spool and the second spool are in the first actuated position, and the fluid exits the double valve through the second common outlet passage when the first spool and the second spool are in the second actuated position, and the fluid does not exit the double valve through either the first common outlet passage or the second common outlet passage when the first spool and the second spool are in the initial position.

12. The double valve as recited in claim 11 including a first solenoid pilot valve and another first solenoid pilot valve associated with the first unitary valve assembly and a second solenoid pilot valve and another second solenoid pilot valve associated with the second unitary valve assembly,
   wherein energization of the first solenoid pilot valve and the another second solenoid pivot valve moves the first spool and the second spool to the first actuated position, and energization of the another first solenoid pilot valve and the second solenoid pivot valve moves the first spool and the second spool to the second actuated position.

13. The double valve as recited in claim 11 wherein, when one of the first spool and the second spool is in the initial position and the other of the first spool and the second spool is in one of the first actuated position and the second actuated position the double valve malfunctions, and the fluid does not exit the double valve through either the first common outlet passage or the second common outlet passage.

14. The double valve as recited in claim 11 wherein, when one of the first spool and the second spool is in one of the first actuated position and the second actuated position and the other of the first spool and the second spool is in the other of the first actuated position and the second actuated position the double valve malfunctions, and the fluid does not exit the double valve through either the first common outlet passage or the second common outlet passage.

\* \* \* \* \*

UNITED STATES PATENT AND TRADEMARK OFFICE
CERTIFICATE OF CORRECTION

| | | |
|---|---|---|
| PATENT NO. | : 8,794,123 B2 | Page 1 of 1 |
| APPLICATION NO. | : 12/722758 | |
| DATED | : August 5, 2014 | |
| INVENTOR(S) | : Jose Carlos Bento | |

It is certified that error appears in the above-identified patent and that said Letters Patent is hereby corrected as shown below:

IN THE CLAIMS:

Claim 3, column 13, line 55; replace "pivot" with --pilot--

Claim 3, column 13, line 58; replace "pivot" with --pilot--

Claim 12, column 15, line 11; replace "pivot" with --pilot--

Claim 12, column 15, line 14; replace "pivot" with --pilot--

Signed and Sealed this
Fourth Day of November, 2014

Michelle K. Lee
*Deputy Director of the United States Patent and Trademark Office*